US008764454B1

(12) United States Patent
Turner

(10) Patent No.: US 8,764,454 B1
(45) Date of Patent: Jul. 1, 2014

(54) INDIVIDUALIZED ACADEMIC FOCUS CREDENTIAL STRUCTURE, SYSTEM AND METHODS THEREOF

(76) Inventor: Scott Christopher Turner, Phoenix, AZ (US)

(*) Notice: Subject to any disclaimer, the term of this patent is extended or adjusted under 35 U.S.C. 154(b) by 256 days.

(21) Appl. No.: 13/160,150

(22) Filed: Jun. 14, 2011

Related U.S. Application Data

(60) Provisional application No. 61/354,606, filed on Jun. 14, 2010.

(51) Int. Cl.
*G09B 7/00* (2006.01)
(52) U.S. Cl.
USPC ............................. 434/322; 434/323; 434/365
(58) Field of Classification Search
CPC .......... G06Q 50/2057; G06Q 50/2053; G06Q 50/205; G06Q 50/20; G09B 7/00
USPC .............................. 434/322, 323, 350, 365, 32
See application file for complete search history.

(56) References Cited

U.S. PATENT DOCUMENTS

| | | | |
|---|---|---|---|
| 2003/0187664 A1* | 10/2003 | Bonebrake | 705/1 |
| 2003/0233242 A1* | 12/2003 | Wenger | 705/1 |
| 2004/0009462 A1* | 1/2004 | McElwrath | 434/350 |
| 2005/0164154 A1* | 7/2005 | Solomon | 434/350 |
| 2006/0242004 A1* | 10/2006 | Yaskin et al. | 705/11 |
| 2006/0252021 A1* | 11/2006 | Watkins et al. | 434/350 |
| 2009/0081629 A1* | 3/2009 | Billmyer et al. | 434/362 |
| 2009/0083638 A1* | 3/2009 | Gupta | 715/752 |
| 2010/0028847 A1* | 2/2010 | Downing | 434/362 |
| 2010/0223194 A1* | 9/2010 | Adams | 705/327 |

OTHER PUBLICATIONS

Bachelor of Science in Business Management, Understanding the Competency-Based Approach, Western Governors University, 2011, 21 pages.

* cited by examiner

*Primary Examiner* — Bruk Gebremichael
(74) *Attorney, Agent, or Firm* — Quarles & Brady LLP

(57) ABSTRACT

The present disclosure relates to a computer-optimized academic credential structure, model and processes, with academic integrity, and associated marketing, for existing or new programs at regionally and nationally accredited and other postsecondary, higher education institutions. In one illustrative embodiment, an academic structure is provided to allow student's individually generated content from parts of multiple courses to be aggregated into a new academic credential, the focus credential. In another illustrative embodiment, a developed and highly innovative computer-enabled Internet-optimized academic credential model and processes, with academic integrity, for existing or new programs at regionally and nationally accredited and other postsecondary, higher education institutions is provided. This model allows a postsecondary student to earn an individualized credential within existing academic program formats.

68 Claims, 16 Drawing Sheets

School of Business & Management
BA Business
BA Business with a Focus in Marketing
    BA Business with a Focus in Public Relations and Marketing
        ... with a Focus in Automotive Industry Public Relations
            ...Focus in Automotive Dealer Public Relations
                ...Focus in Toyota Automotive Dealer Public Relations

BA Business
BA Business with a Focus in Marketing
    ...with a Focus in Public Relations Crisis Management
        ...Focus in PR Crisis Management in the Energy Industry
            ...Focus in PR Crisis Management in the Utilities Industry
                ...Focus in PR Crisis Management in Nuclear Power Industry
                    ...Focus in PR Crisis Management in US Nuclear Power Industry

School of Human and Social Services
BS Social Services
BS Social Services with a Focus in Family Social Services
    ...with a Focus in Children's Social Services
        ...Focus in Abused Children Social Services
            ...Focus in Municipal Government Abused Children Social Services
                ...Focus in Municipal Government Abused Children Social Services in Alabama

School of Education
MA Education
    ...with a Focus in Teaching
        ...Focus in Elementary School Teaching
            ...Focus in Teaching Reading in Elementary Schools
                ...Focus in Teaching Reading in Inner City Elementary Schools
                    ...Focus in Teaching Reading in Inner City Elementary Schools to Immigrant Children
                      ...Focus in Teaching Reading in Inner City Schools to Immigrant English Language Learner Children

School of Engineering and Applied Science
MS Materials Engineering
    ...with a Focus in Covalent Crystals
        ...with a Focus in Composite Materials
            ...with a Focus in Metals
                ...with a Focus in Vitreous Materials
                ...etc.

FIG. 3

| Course Assessment: Individualized Content Assessed toward Focus Credential |||||
|---|---|---|---|---|
| Course: ENG 101  English Composition  Instructor: Prof.Doe  Student: Susan Smith<br>Student ID#: 1234567  Program of Study: BA Business  Focus: Public Relations |||||
| Activity | Student's Work Description | # Pages/ Comments/ Slides/ or Equivalents | Instructor Comments | Provisional Grade for Focus Content |
| Essay- Persuasive Writing | Memo to Auto Dealer on Using Public Relations Effectively | 7 | Well-structured with key bullet points on PR strategies & supporting evidence | B |
| Essay- Creative Writing | Fictional Story on Public Communications Crisis at Auto Dealer | 8 | Good description, interesting plot; showed apparent understanding of auto dealership environment | B |
| Online Discussion | Misc. Comments on writing & PR | NA (discussion comments do not count for Focus credit for this course) | | |
| (note: each course name contains hyperlink to student's content for that course) | | | | |

| Focus Status Summary: Individualized Content Assessed toward Focus Credential |||||||
|---|---|---|---|---|---|---|---|
| Student: Susan Smith  Student ID#: 1234567  Program of Study: BA Business<br>Focus: Automotive Dealer Public Relations |||||||
| Course | Essays (# pages) | Discussion (# separate comments, up to course maximum usable toward Focus) | Slides (# Power-point slides or others) | Projects/ Other (list equiv-alent, e.g.# Pages) | Descri-ption/ Com-ment | Provisional Grade for Focus Content | Course Grade |
| English Composition | 15 | | | | | B | B+ |
| Intro. To American History | 12 | 7 | | | | B | B- |
| Ethics & Philosophy | 7 | 9 | | | | B | B+ |
| Intro. to Management | | 27 | 10 | | | A- | B+ |
| Intro. to Marketing | 15 | 20 | 10 | | | A- | A- |
| | | | | | | | |
| Earned: Subtotal | 49 | 48 | 20 | | | B+ | B+ |
| | | | | | | | |
| Min. Required: Total | 100 | 75 | 40 | TBD | | B- | C |
| | | | | | | | |
| Note: Focus content quantity and quality granted, including Focus grades, are subject to additional review by the university, beyond the original course instructor's assessment. In particular, Focus assessment from courses outside the major program of study, including all general education courses, are likely to receive additional review by the university. Focus content from outside the major may not make up more than one-third of the total credit needed toward a particular Focus Credential, unless a special waiver is granted. A standard page=300-375 words; a standard discussion comment will have 3-5 sentences; a standard Powerpoint slide will have one key image with a clear description or 3-5 key bullet points. |||||||

FIG. 4

| Degree Plan for Focus Credential: Sample Individualized Content Activities to Complete Focus Credential |||||||||
|---|---|---|---|---|---|---|---|
| BA Business with a Focus in Automotive Dealer Public Relations example Course | Essays (# pages) | Discussion (# separate comments, up to course maximum usable toward Focus) | Slides (# Powerpoint or others) | Projects/ Other (list essay pages equivalent for project/ assignment) | Description/ Comment | Provisional Grade for Focus Content (If applicable) | Course Grade |
| Focus credit earned to-date | | | | | | | |
| English Composition | 15 | | | | | B | B+ |
| Intro. to American History | 12 | 7 | | | | B | B- |
| Ethics & Philosophy | 7 | 9 | | | | B | B+ |
| Intro. to Management | | 27 | 10 | | | A- | B+ |
| Intro. to Marketing | 15 | 20 | 10 | | | A- | A- |
| Earned: Subtotal to-date | 49 | 48 | 20 | | | B+ | B+ |
| (note: each course name contains hyperlink to student's content for that course) | | | | | | | |
| Potential course activities for the Degree & Focus | | | | | | | |
| Operations Management | Up to 10 pages | Up to 20 comments | Up to 15 slides | Up to 15 pages equivalent | | | |
| Intro. to Accounting | NA | Up to 10 comments | NA | Up to 20 pages equivalent | | | |
| Financial Management | NA | Up to 20 comments | Up to 10 slides | Up to 20 pages equivalent | | | |
| Intro. To Human Resources | Up to 20 pages | Up to 25 comments | Up to 10 slides | NA | | | |
| Business Communications | Up to 30 pages | Up to 25 comments | Up to 20 slides | NA | | | |
| Entrepreneurship & Innovation | Up to 20 pages | Up to 25 comments | Up to 15 slides | NA | | | |
| Strategic Planning & Management | Up to 30 pages | Up to 25 commets | Up to 15 slides | NA | | | |
| [Business Elective TBD, e.g. Advertising and Marketing Communications] | TBD (max. 30 pages) | TBD (max. 25 comments) | TBD (max. 20 slides) | TBD (max. 30 pages equivalent) | | | |

FIG. 5A

| (a) | (b) | (c) | (d) | (e) | (f) | (g) | (h) | (l) |
|---|---|---|---|---|---|---|---|---|
| [Focus Independent Study Option, if additional Focus credits needed] | TBD (max. 40 pages) | TBD (max. 30 comments) | TBD (max. 20 slides) | TBD (max. 40 pages equivalent) | | | | |
| [Focus Portfolio Assessment Option, if additional assessment is needed for prior Focus content] | TBD (max. 40 pages) | TBD (max. 30 comments) | TBD (max. 20 slides) | TBD (max. 40 pages equivalent) | | | | |
| (note: each course name contains hyperlink to Course Focus Template showing how focus content can be earned from that course) | | | | | | | | |
| Min. Required: Total | 100 | 75 | 40 | TBD | | | B- | C |
| Note: a single 3-credit course cannot provide more than one-third of the total credit needed toward a particular Focus Credential, unless a special waiver is granted. A standard page = 300-375 words; a standard discussion comment will have 3-5 sentences; a standard Powerpoint slide will have one key image with a clear description or 3-5 key bullet points. |||||||||

FIG. 5B

COURSE ACTIVITIES TEMPLATE FOR FOCUS CREDENTIAL [NONEXCLUSIVE EXAMPLE]

| Course Activities Template: Business Communications course example (Weeks 1 & 2) Activity | Essays (max. # pages usable toward Focus Credential) | Discussion (# separate comments, up to course maximum usable toward FC) | Slides (# Powerpoint or others, maximum usable toward FC) | Projects/ Other (list essay pages equivalent for project/ assignment) | |
|---|---|---|---|---|---|
| Total Potential Student-Generated Content usable toward Focus Credential from this Course | Up to 30 pages | Up to 25 comments | Up to 20 slides | NA | |
| | | | | | |
| Potential learning activities, of which focus content-eligible activities: | | | | | |
| Week 1: | | | | | |
| Introductory Online Lecture | NA | NA | NA | NA | |
| Personal Introductions | NA | NA | NA | NA | |
| Discussion on Role of Communications in Business | | Up to 4 comments | | | |
| Brief Essay on Personal Example of Effective Business Communications | Up to 3 pages | Up to 1 comment | | | |
| Textbook Reading | NA | NA | NA | NA | |
| | | | | | |
| Week 2: | | | | | |
| Lecture Introducing Visual Communications | NA | NA | NA | NA | |
| Textbook Reading Visual Communications | NA | NA | NA | NA | |
| Discussion on Visual Communications | | Up to 4 comments | | | |
| Powerpoint Case Study: Persuasion through Graphics | | Up to 1 comment | Up to 7 slides | | |
| | | | | | |
| | | | | | |
| | | | | | |
| | | | | | |
| | | | | | |

FIG. 6

|  | | | | | |
|---|---|---|---|---|---|
| Marketing Cost & Competition | High | BA Business | BA Business with a Focus in Marketing | BA Business with a Focus in Public Relations and Marketing | BA Business with a Focus in Automotive Dealer Public Relations |
| | Low / Less Narrow | | | | |
| | | | Narrowness of Focus | | More Narrow |

FIG. 11

INDIVIDUALIZED ACADEMIC FOCUS CREDENTIAL STRUCTURE, SYSTEM AND METHODS THEREOF

REFERENCE TO RELATED APPLICATIONS

This disclosure claims priority to U.S. Provisional Application No. 61/354,606 titled DRAFT COMPUTER AND INTERNET-ENABLED INDIVIDUALIZABLE CREDENTIAL-BASED RETROFITTABLE SCALABLE ACADEMIC PROGRAM MODEL AND PROCESS: IS IT PATENTABLE that was filed on Jun. 14, 2010 to Scott Turner.

TECHNICAL FIELD

This disclosure generally relates to academics, and more particularly, to a transformational and optimized academic credential structure, model and processes, and related marketing process, with academic integrity, for existing or new programs at regionally and nationally accredited and other postsecondary, higher education institutions.

BACKGROUND

The education system in the United States and most industrialized countries is highly structured and generally inflexible. A long-established logical process developed over many years takes the student through a myriad of commonly accepted subjects and classes to provide a set of capabilities in preparation for adult life, with associated credentials. In the common progression, the student enters pre-school or grade school and then advances to middle school or junior high school. In most jurisdictions, the grade school through middle school process, i.e., typically grades 1-8, takes about eight years.

Today, students are typically exposed to history, geography, natural sciences, English, mathematics, art, music as well as other subjects to prepare for their secondary schooling years. In secondary schools, the students take similar classes at a more advanced level to prepare for post-secondary education. The students are typically exposed to the traditional secondary curriculum in grades 9-12, which typically takes four years to complete.

From secondary school, many students attend post-secondary school(s), either by enrolling in a vocational-technical career college, a four year college or university, or by attending a community college for one or two years and then in some cases transferring to a four year college or university. The post-secondary setting will typically have some general coursework required of all students, e.g., English, humanities, social science, and basic college math and natural sciences, which is typically referred to as "general education". The post-secondary student relatively quickly engages in the course work specific to their selected degree program. By the second half of the post-secondary program, the student is typically heavily immersed in their chosen academic discipline and their primary field or program of study, in other words, major field of study or program of study, termed a "major" at the undergraduate level. The student can then continue on to graduate school, typically to receive a master's degree in a primary field or program of study, which is indicated by the degree name, e.g., a Master's in Business Administration, or MBA. If the student continues even further, the student can receive a more advanced, doctoral degree.

Traditionally, the student can also qualify to receive an additional undergraduate credential, typically termed a minor and sometimes a concentration, to reflect additional learning in a second discipline area, though not as extensive learning as required for a major. In some cases, the student can also be able to add more specific learning to the major or master's primary program of study, which can be termed a concentration, specialization, or similar terminology. In all of these cases, the institution requires that the student take particular courses, in order to qualify for an institutional credential. In some cases, courses transferred from other institutions can be used to satisfy these requirements, but generally only if these transferred courses cover fundamentally the same content as the institution's comparable courses, i.e., the transferred courses are "course equivalents" to the institution's courses.

These traditional degrees, which dominate academia in the United States, are based on using courses as building blocks of degrees, and course credits associated with each course to calculate how much each course counts toward the total credits needed for the degree. Content to be used toward an academic credential is counted and assessed, in so far as the course description (and associated course number, number of credits, etc.) satisfies itemized academic requirements, typically summarized by course title and number. Students can also in some cases take independent study, (honors) research, directed reading, capstone, portfolio or other courses, in which the key content is typically defined and contracted to between the instructor and the student. This current status quo, the prior art, is referred to in this patent disclosure as a course-centric model.

In addition, it can be expensive and in many cases cost prohibitive, even with aggregated national demand online, to develop a separate undergraduate major or graduate program, or even a separate pre-set concentration or specialization, for each possible subject area of interest to students.

Over the last three decades, in particular, more and more working adults have returned to college to complete their undergraduate degree or to earn a graduate degree. Institutions offering programs to working adult students have found that the most effective programs for these students involve engaging students in their studies by showing how what the student is learning applies to his or her own life. In other words, programs for working adults typically involve focusing heavily on application of theory to practice, more than abstract theories and concepts alone with minimal real-life application. Since working adult students typically have significantly more "real-world" experience than traditional students with limited or no work experience who have progressed directly from high school to college, working adults have significant prior experiential learning of their own, which they bring in to the program, and use as they participate in course assignments. These working adult, real-world application-oriented educational practices are supported by widely accepted adult learning and adult development theory, sometimes referred to as andragogy (analogous to how pedagogy is based on child development theory), such as articulated by Malcolm Knowles.

Much of the application of theory to practice is generated by the student him/herself. This individually applied learning is demonstrated by the student for the instructor's assessment through essays, classroom or online discussions, tests, presentations, other, projects, and in other ways, in which the student typically proves that he/she has learned, by relating the course's theoretical concepts to the student's career and personal interests. For example, the student can take a course in English composition, and write an essay in the form of a business memo related to his/her workplace. The student can take a course in history or economics, and discuss his/her industry's role in the development of the American economy. The student can take a course in marketing, and discuss how his/her employer could improve the marketing of their services. The student can take a course in finance, and analyze his/her employer's financial statements.

In other words, the student generates his or her own individualized content, typically related to the student's current or future work, as part of taking the course and providing material to be assessed by the instructor. Yet even though, in the course of an undergraduate or graduate academic program, the student can generate large amounts of individualized content with an emphasis on a particular area, such as an industry, job function, and/or other area of emphasis, throughout a large number of courses that the student takes during the academic program, this student-generated content is not acknowledged distinctly in existing prior art academic credentials. Instead, even a student with a large amount of individualized content with a particular emphasis, which can be dramatically different from the emphasis of the individualized content generated by peer students taking the same courses, receives exactly the same academic credential as other students taking the same courses.

Academic institutions have not developed a credential to consolidate and reference this individualized learning Instead, the academic community has continued to offer traditional named degree categories such as majors, minors, concentrations, and specializations based on standard course content as measured in whole course increments. The academic community has failed to recognize and credential the individually generated course content in highly varied subject areas within standard courses, which occurs during typical existing working adult academic programs, and which the working adult student, in particular, typically develops and submits his/herself.

Academic credentials provide significant value to students, which has helped to make higher education a $400 billion per year industry in the United States, with over 4000 regionally and nationally accredited colleges and universities. Working adult-oriented programs represent the fastest growing large segment of the higher education market, and in the future are expected to become the largest segment of the higher education market. Of the more than 18 million students enrolled in postsecondary education, approximately 25% or about 4.5 million are part-time students, of whom 80% work, and 75% or about 13.5 million are full-time students, of whom about 40% work. In addition, about half of postsecondary students are financially independent. Over 7 million individuals above 25 years of age are enrolled, and adults and students working full-time make up over 40% of undergraduate enrollments; indeed, about two-thirds of working adult students see themselves more as employees than students. Many of these working adult students are involved in academic programs structured specifically for working adults. As noted earlier, these programs tend to be very career- and application-oriented rather than covering more abstract, theoretical, and/or traditional liberal arts areas. In addition, as employment complexity increases, a combination of both broad and specific skill sets are needed by employees and their employers.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present disclosure, a method of transforming a traditional educational primary program of study degree to a focused primary program of study degree is provided. The method can include defining a focus credential structure and process to include focus credential required activities. The method can include associating an instance of the focus credential structure and process with a student. The method can include generating content in course activities from courses attended by the student achieving a degree of satisfaction of at least some of the focus credential required activities. The method can include awarding a focus credential to the student where the focus credential is an additional credential to a major program of study degree credential of the student, when all of the focus credential required activities have been satisfied.

In accordance with one aspect of the present disclosure, a computer-implemented method for selecting, setting standards, and reviewing a content based focus credential to an individual is provided. The method can include defining focus credentials. The method can include receiving approval for the focus credentials. The method can include iteratively reviewing the focus credentials dependent on at least one of faculty, administrator, student, market research, and marketing reviews.

In accordance with one aspect of the present disclosure, a computer-implemented method for generating and assessing content for a content-based focus credential to an individual is provided. The method can include defining a focus credential. The method can include determining emphasized content corresponding to a focus credential associated with an individual. The method can include assessing the individual based on the emphasized content.

In accordance with one aspect of the present disclosure, processes for a focus credential server are provided. The focus credential server can include at least one processor and a memory operatively coupled to the processor, the memory storing program instructions that when executed by the processor, causes the processor to perform processes. The processes can include defining and approving a focus credential model. The processes can include modifying existing systems to the focus credential model. The processes can include providing focus credential offerings defined in the focus credential model within the modified existing systems. The processes can include developing keywords associated with the focus credential offerings. The processes can include marketing the keywords.

In accordance with one aspect of the present disclosure, an academic system is provided. A server managing focus credentials for a plurality of students within an institution is provided. The focus credentials are dependent on individualized subject matter or course content of courses offered by the institution, the courses comprising at least one of general education courses, elective courses, non-major courses, major courses, and combination thereof aggregated to define the focus credentials.

In accordance with one aspect of the present disclosure, in a computer network having at least two computing devices in communication, a method for marketing a focused degree accessible on the network is provided. The processes can include selecting keywords associated with a plurality of focus credentials offered by an institution. The processes can include providing the keywords associated with the plurality of focus credentials to an informational database whereby the informational database processes the keywords for distribution of information maintained thereon.

In accordance with one aspect of the present disclosure, a computer-implemented method for generating a content-based focus credential for a student is provided. The processes can include defining a focus credential by a student.

The processes can include approving the focus credential by an institution. The processes can include determining emphasized content corresponding to the focus credential. The processes can include assessing the student based on the emphasized content.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as some of many possible modes of use, further objectives and advantages thereof, will be best understood by reference to the following detailed description of illustrative and nonexclusive embodiments when read in conjunction with the accompanying drawings herein:

FIG. 3 is a diagram representing exemplary focus credentials that can be awarded by institutions and earned by students in accordance with one or more aspects of the present disclosure;

FIG. 4 is a chart showing an exemplary template as part of a process for students to generate content related to a focus area, and for that content to be assessed and tracked by the institution, and for other activities, in accordance with one or more aspects of the present disclosure;

FIGS. 5A and 5B are charts showing an exemplary template as part of a process for students and institutions to track progress toward achieving a focus credential, and to show students how they can generate additional content related to a focus area, in order to earn a focus credential, and for other activities, in accordance with one or more aspects of the present disclosure;

FIG. 6 is a diagram showing an exemplary template, as part of a process for students to generate content related to a focus area within a particular course, and for that content to be assessed by the institution, in accordance with one or more aspects of the present disclosure;

FIG. 11 is a chart depicting keywords and marketing communications cost benefits in accordance with one or more aspects of the present disclosure;

DESCRIPTION OF THE APPLICATION

Figure 1:
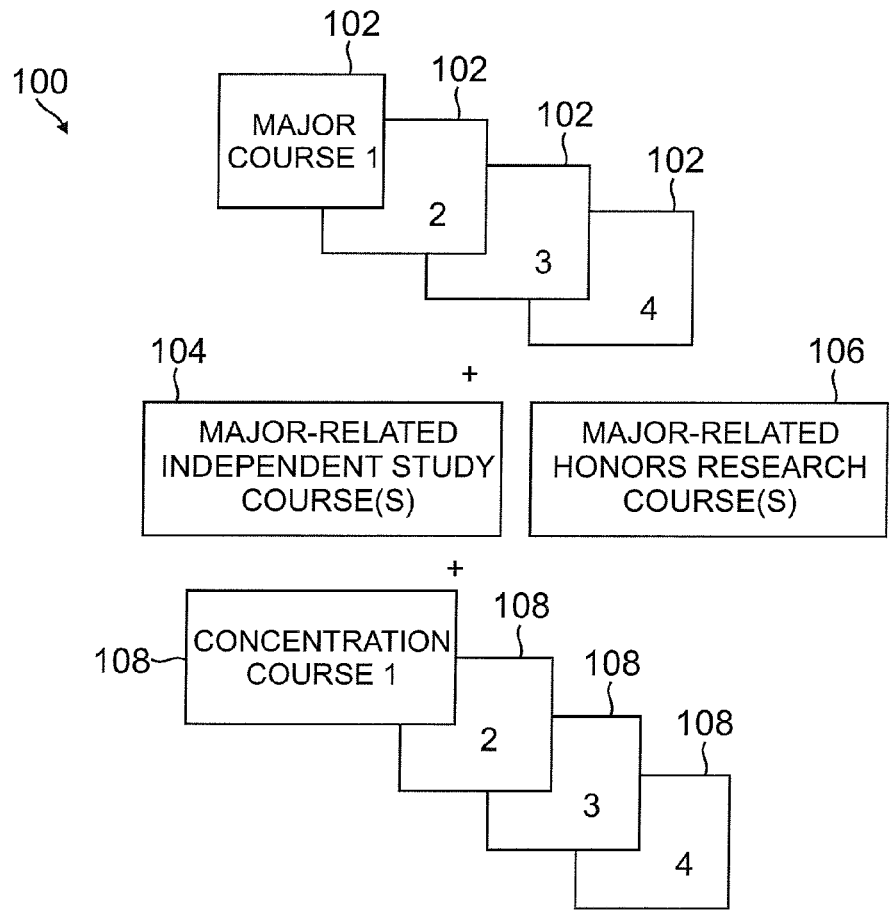
FIG. 1 is a prior art block diagram representing majors and related concentrations in accordance with one or more aspects of the present disclosure.

The description set forth below in connection with the appended drawings is intended as a description of some of many possible embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The data structures and code described in this detailed disclosure are typically stored on a non-transitory computer-readable storage medium, which can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed disclosure section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Throughout the present disclosure, a number of terms are used. These terms are defined through the definitions below and examples found throughout. Those skilled in the relevant art, however, will appreciate that these terms can deviate from these definitions. The term "Focus" can refer to the individual student's academic emphasis in a particular area during much of the academic degree program course of study. "Focus content" can refer to content generated by the individual student related to the focus area (part of the student's total individualized content during enrollment in the academic program). "Individualized content" can refer to the student's individually generated content, which can be applied toward earning the focus credential, if the individualized content is in the focus area.

"Focus area" can refer to the subject area in which the individual student's focus-related content is based, to be used for the focus credential, which is generally related to and a subset of a larger primary program of study within a degree program. "Primary program of study" can refer to the student's main study emphasis, such as a "major" (e.g., a major field of study within an Associate or Bachelor's degree program, or the primary field of study of a Master's degree program as designated by its title, e.g., Business Administration is the primary program of study of an MBA program). "Micro-focus" can refer to a narrowly defined focus area within a broader focus area, which can include functional areas (functional departments, (s) e.g., Marketing, Sales); other horizontal areas (e.g., PR or Community Relations); vertical area (e.g., Automotive Industry including Automobile Dealerships); geographic areas (e.g., Midwest, Southern California, NYC, Asia); and/or other components; and combinations thereof.

"Focus structure" can refer to the academic apparatus used to hold the focus-related content to be used for the focus credential. "Focus credential" can refer to the credential provided by the institution to the student, who has created adequate focus-related content to qualify. "Focus credential process" can refer to the computer-enabled process for selecting, setting standards, reviewing, instructing, supporting, assessing, engaging in other activities, and generally administering focus credentials. "Focus credential required activity" can refer to a student content-generating activity, such as an essay, discussion comment, PowerPoint® slide presentation, test, or other project or activity, of the type required by the institution, in order to count toward the focus credential.

"Focus credential marketing process" can refer to the computer-enabled process for marketing focus credentials and engaging in related activities, in order to recruit students. "Institution" can refer to a postsecondary academic institution, typically a college or university with regional or national accreditation, and can include third-parties with whom the institution works. "Third-party" can refer to a service organization, which an institution can use, directly, or indirectly through intermediaries, to provide a service such as but not limited to advertising, search engine optimization, student management, and/or other promotion and marketing communications or other activities.

"Horizontal" can refer to a functional or skill set area that typically crosses multiple vertical industries, such as Accounting, Marketing, Nursing, Mechanics, Engineering; or the departmental or organizational level, such as Supervision, Management, Entrepreneurship, Small Business, Consulting, Field, Staff, etc.; but also narrow segments within functional areas, such as Forensic Accounting, Automobile Advertising, Nursing Home Care-giving, Motorcycle Mechanics, Aerospace Engineering, etc. Horizontal interests can also be by geography, such as global, national, regional, state, county, or local, or other horizontal categories that cut across industries. "Vertical" can refer to an industry area such as public/government or non-profit as well as for-profit, including but not limited to construction, manufacturing, utilities, education, health care, defense, government, other services, etc., but also narrow segments within industries, such as hospital design, semiconductor manufacturing, wireless data services, early childhood schooling, nursing homes, army base administration, fire-fighting, child abuse social services, municipal government parks and recreation management, and thousands of other areas, etc.

The focus credential structure provides an apparatus that enables related processes to build a credential. The focus credential structure allows the student to generate individualized content about a particular area of interest to the student through a number of diverse courses, including both major and/or non-major field of study courses, rather than using only whole courses related to the major field of study. The focus credential structure is an apparatus for accumulating such individualized content generated by the student in a particular focus area, such that the student's focus content becomes sufficient to earn a distinct academic credential. One transformation consists of the additional use of student-generated content toward a new kind of credential, rather than just the prior art use of student content only to meet the requirements of the course and thereby of the traditional degree program credential; such content in at least some embodiments now can also demonstrate specialized learning by an individual student in a particular focus area. What is more, the focus credential is not intended primarily to stand alone, but to enhance a traditional academic credential, such as an undergraduate major or a graduate primary program of study. In other words, the focus structure also enables the transformation of a traditional credential, by better describing and assessing the individualized learning in a focus area of emphasis demonstrated by the individual student, while earning the traditional credential as part of the overall degree program, and thereby makes the traditional credential more valuable as well.

Figure 2:
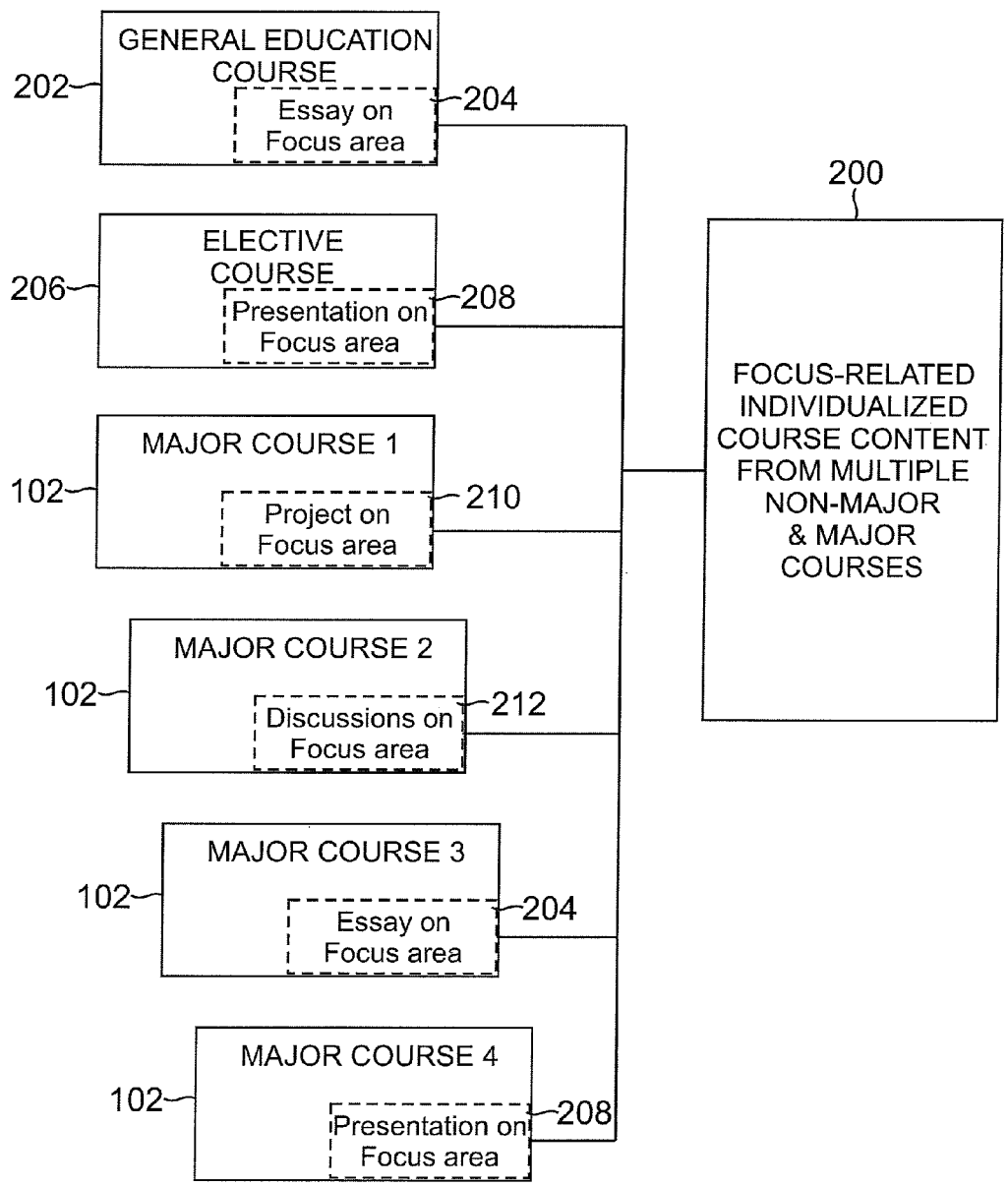
FIG. 2 is a block diagram showing exemplary individualized course content from multiple non-major and major courses in accordance with one or more aspects of the present disclosure.

Illustrative embodiments of the focus structure apparatus and a comparison to the prior art, and exemplary but nonexclusive illustrations are included in FIGS. 1, 2 and 3. FIG. 3 shows a very small percentage of the total possible focus credentials in given exemplary focus areas. Please note that any of these focuses or variations on them are possibilities, from the general level such as BA Business with a Focus in Marketing to BA Business with a Focus in Toyota Automotive Dealer Public Relations, and everything in-between or associated with them. More details are provided elsewhere in this disclosure.

Using various aspects of information and communications technology (ICT), often combined with manual sub-processes, and related activities, a computer-based system can be used to conduct market research, screen and select appropriate focus credential areas, develop focus credential requirements, and perform other activities, which will be optimal for the institution and student. This process can proceed iteratively, with a series of manual and/or automated activities, as needed by the institutions to satisfy its requirements. More details are provided elsewhere in this disclosure. As one illustrative embodiment, a business and management college with degrees in business, management, marketing and accounting, can consider offering a separate credential as a second credential, termed the "focus" credential, which "modifies" the major program of study, similarly to the way in which an adjective modifies a noun. The focus credential name is based on the individual content generated by the student as he/she earns his/her degree, and does not inherently require taking additional courses in the major program of study.

As another illustrative embodiment, as part of its marketing degree, the institution can already offer a public relations (PR) course. While the institution could not wish to teach additional public relations courses, especially large numbers of PR courses, it does recognize that many of its students are interested in public relations, including students who are using PR in their current work, working in PR full-time, or wishing to do so in the future. In addition, the institution realizes that, in its working adult-oriented degree programs, in particular, students have significant opportunities, during their academic program courses, to learn and demonstrate their knowledge of how to apply marketing and other business theories, including public relations, to the student's real-life job and personal practices. The institution can therefore decide that it will offer to credentialize a student's individual work related to public relations, which the student generates through the institution's existing courses. So the institution decides to offer a Focus in Public Relations, and sets appropriate standards and processes for a student to qualify for this focus.

Continuing with this illustrative embodiment, the institution recognizes that there are many different aspects of public relations, including different PR-related issues and functional skill sets, industries and types of organizations for which PR is practiced; however, the institution cannot possibly offer courses in each of those niche sub-areas, termed here "micro-focuses"; yet the student has many different opportunities through the typical institutional in-course assessment process during standard courses to demonstrate learning of knowledge of a niche sub-area within a focus area through essays, discussions, presentations, tests, projects, etc. about different aspects of public relations including the particular aspects of PR in which the student is most interested. In addition, if a student focuses in a particular area of public relations, such as for the automotive industry, or even more narrowly emphasizes PR for automobile dealers, for example, the institution can allow the student's focus credential to explicitly reference that narrow niche micro-focus as well as the broader public relations focus.

The institution can use manual and/or computer-based processes to identify the full range of focus credentials related to PR, which it is willing to credentialize. Typically, to identify the many thousands of micro-focuses, which can be relevant to a particular focus area, computer-based processes are needed. These processes can run on a computer software program created or licensed by the institution, or can be operated by a third-party whose services are used by the institution. Typically, some manual review by institutional academic personnel can be needed, to check whether particular micro-focus areas are considered appropriate by the institution to offer as standard micro-focuses within a particular focus.

In addition, continuing with the public relations example, the institution can also offer a process for the student to select a unique self-defined PR-related focus credential, using institutional policy guidelines, which reflect that one student's particular micro-focus. This latter process will typically involve a Web-based computer process initiated by the student, with appropriate review and approval by institutional personnel.

The institution can typically also develop standard criteria to qualify for a focus credential, such as a certain number of double-spaced pages or number of words of essays, as a certain number of words of discussion, a certain number of slides of PowerPoint® presentations, etc. related to the focus content, which a student must produce while enrolled at the institution, in order for a student to be considered as eligible for a focus credential. These and other focus-related policies and practices, which are partially reflected, for example in FIGS. 4, 5A and 5B and the notes thereto, can be implemented through standard requirements. For the Focus in Public Relations, these standard requirements might for example be: min. 100 pages of essays related to public relations during the degree program; min. 75 discrete discussion comments related to public relations totaling at least 2500 words; min. 40 PowerPoint® presentation slides; or the equivalent number of other non-essay projects related to public relations; or some other combination of essays, discussion comments, presentations, test content, and other individually generated content equivalent to these standards in terms of demonstrating comparable content knowledge of public relations.

Furthermore, an additional process can be implemented by the institution to review potential focus credentials, which are related to already approved focus credentials, but which have not yet been specifically approved themselves by the institution. In the case of marketing and public relations, for example, in several illustrative embodiments, the review process can allow the student to apply for and the institution to approve a new and more narrowly focused credential in public relations and crisis communications, or automotive dealer public relations, etc., or the institution can for example include a new and broader credential such as public relations and advertising.

In addition, the student can be given an opportunity to supplement this in-course student-generated content with additional student-generated content in an independent study or similar course, in order for the student to reach the required threshold of demonstrated content knowledge. In addition, the above quantity standards can be supplemented by quality standards. These can, for example, be as simple as that the student needed to receive at least a B grade in each of the courses, from which individually-generated content is used toward the focus credential. Or it can be more detailed, requiring the instructor's grade of the specific content used, rather than just the overall course grade. Or more detailed assessment can be required, for content generated in courses outside the student's major field of study, such as general education or miscellaneous electives, in which the instructor can be completely unfamiliar with the focus content subject area. Or the review process can be even more detailed, such as requiring a separate review of some or all of the content used to earn the focus credential, beyond the instructor's original assessment conducted during the course from which the content is taken. More details on this are provided elsewhere herein, particularly in the assessment section.

Using various aspects of information and communications technology (ICT), often combined with manual sub-processes, and related activities, a computer-based system can be used to generate and assess content during courses, in which the content generated by the student can be used toward a focus credential. This process can proceed iteratively, with a series of manual and automated activities, as needed by the institution to satisfy its requirements. As one illustrative embodiment, using the Focus in Automotive Dealer Public Relations example delivered in an online program, and referring to FIGS. 4, 5A and 5B, the student can take a series of general education ("gen-ed") courses as part of meeting the institution's undergraduate degree program requirements. These gen-ed courses can include courses in areas such as English Composition, American History, Economics, and the Arts. So, for English Composition a public relations-focused student can write an essay in creative writing required for that course, about a hypothetical fictional series of events at a PR firm with an auto dealer client, or perhaps a crisis in an automobile dealer causing a major PR problem; for a required essay in persuasive writing, the PR-focused student can write a memo to a potential auto dealership client on recommendations for a PR strategy and why the auto dealer should choose the student's PR firm. For the History course, the student can write an essay and engage in online discussion highlighting the role of communications in the political history of the US. For the Economics course, the PR-focused student can discuss how the Federal Reserve Bank uses effective communications strategies to present and persuade the public about macroeconomic policy, analysis and information, and what impact such policy has on the automobile industry. For the Arts course, the student might prepare a project showing how graphic arts are used in public relations, such as signage and brand imaging, with some auto dealer examples.

Such individualized content directed toward the student's principal area of personal interest has the added benefit of engaging the student more effectively in the academic program, and such engagement helps to improve the student's performance and persistence in the academic program, even when taking general education courses outside the student's main areas of interest, i.e., the major program of study and the focus area.

Indeed, the academic institution can over time modify assessments for certain general education courses, or provide alternative general education courses, that ensure academic integrity, while allowing for student generation of significant amounts of individualized focus-related content; since so many students in a wide variety of programs of study take the same gen-ed courses, providing one focus-friendly gen-ed course in each general education requirements category would cost little for online programs. In addition, other non-major and major courses could be cost-effectively modified, or new courses created, which allow optimal generation of focus-related content, while preserving academic integrity, maintaining existing traditional credential programs, and meeting other academic requirements. It is much easier and more cost-effective for institutions to modify courses than to add new courses, and it is much easier to add new courses than to add new majors, minors, or other traditional credentials. As a result, adding new focus credentials and providing a range of ways for students to earn those credentials is much easier and more cost-effective than for traditional credentials, yet allows the institution to continue to offer existing traditional credentials with minimal changes.

For courses, which the student is taking for the major, for example, continuing with the public relations illustrative embodiment, a PR-focused student could, in the introduction to management course, discuss the role that corporate, marketing and employee communications play in the business world, citing a case study involving auto dealerships. In the introduction to marketing course the student could focus particular attention on how public relations plays a crucial role in the promotion of new products and services, and/or how the student's PR firm utilizes various marketing strategies and tactics to enhance its success for its automobile dealership clients. In the advertising course, the PR-focused student could develop a PowerPoint® presentation on integrated advertising-and-public-relations approaches that are particularly effective. All of this content can be communicated through and stored in the institution's student and learning management system databases, and this archived content database can in certain embodiments become the basis for the focus assessment system. Furthermore, if content is deemed to be lacking in some respects during the assessment process, as described elsewhere, a special focus content generation course can be provided, akin to an independent study course, to develop additional content satisfactory for finishing earning a focus credential.

Using various aspects of information and communications technology (ICT), often combined with manual sub-processes, and related activities, a computer-based system can also be used to assess the content of courses, in which the content generated by the student can be assessed and/or considered to count toward a focus credential. As one illustrative embodiment, continuing with the Focus in Automotive Dealer Public Relations example, and referring to FIGS. 3 and 4, the student can be working in the public relations area, and taking an introduction to marketing course, and the course requirements can call for an essay on how basic marketing principles would apply to the student's employer. The student's essay would therefore be directed at applying marketing theories to public relations; furthermore, the student could specifically apply those principles to automotive dealerships in the essay. The instructor assesses the essay, including the portion focusing particularly on PR for automotive dealers, in the normal course of assessing the student's work, and provides an evaluation and grade for the essay.

As noted in FIG. 4, this evaluation and grade can be part of the student's record, and can be saved in the institution's learning management (LMS) system, such as but not limited to the Blackboard® LMS system. What is more, an additional focus content assessment system element could allow the instructor to rate the total quantity and/or quality of the student's focus-related work during that course, and the institution could also store that information in the LMS. Indeed, all of the student's content, particularly in an online environment, can typically be submitted through the LMS or similar system, and stored in it during the course, and can also be archived in the LMS or another database for the duration of the student's enrollment at the institution, and even beyond that time after enrollment. Hyperlinks can connect from archived course information to focus credential-related template embodiments, such as course assessment and degree plan templates. This longer-term computer-based and Web-accessible storage then allows for online retrieval and then optionally "manual" assessment by other faculty or assessment specialists of the institution in the future, and/or automated assessment.

Automated assessment can include word and phrase search of focus-related content, and/or more advanced processes such as "artificial intelligence," to assess the quantity and/or quality of the student's individualized focus-related content. Using iteration, an additional activity of manual assessment can be used after automated automation, and so on iteratively with a series of manual and automated activities, as needed by the institution to satisfy its academic requirements. This process can be conducted at any stage of enrollment, thereby allowing the student and his/her student advisement services to know how the student is progressing toward the focus credential, and what additional individualized content can have to be provided. This process allows the institution to ensure academic integrity at very low cost, while allowing the student who has generated a large volume of quality individualized focus content to do little or no additional work beyond what he/she has already done to earn a focus credential.

For example, continuing with the earlier illustrative embodiment, as summarized in FIG. 4, after taking 10 courses at the institution, a student intending to earn a Focus in Automotive Dealer Public Relations can have generated and had assessed the following content from the following courses:

English Composition: 8 page fictional prose essay describing a hypothetical day-in-the-life of a PR agency, whose automotive dealer client is facing a serious image crisis; 7 page business memo essay making a recommendation to an automotive dealer on how it can improve its public relations.

Introduction to American History: 12 page essay on the role of effective communications in the political history of the United States; 7 separate discussion comments in online course forums on how communications impacts key developments in US history.

Ethics & Philosophy: 7 page essay on ethical issues in public relations, particularly in regard to automotive dealers; 9 separate discussion comments on ethical issues in public relations, particularly in regard to automotive dealers.

Introduction to Management: 10 slide PowerPoint® presentation on the role of communications—public, employee, industry, etc.—in the management of automotive dealers; 15 separate discussion comments on public relations in management; 12 separate discussion comments on public relations, including regarding automotive dealers.

Introduction to Marketing: 10 slide PowerPoint® presentation on integrating public relations into an automotive dealer's overall marketing strategy; 15 page case study essay on how a particular automotive dealer used public relations to dramatically improve its image and increase sales; 20 separate discussion comments on automotive dealer public relations in the context of general marketing.

The content in the above example related to a Focus in Automotive Dealer Public Relations totals: 49 pages of essays; 48 separate discussion items; and 20 PowerPoint® slides. Therefore, the student must still generate and have assessed 51 pages of essays; 27 separate discussion items; and 20 PowerPoint® slides, or the equivalent acceptable to the institution. Part of the above example is summarized in FIG. 4. Additionally, a student will typically but not necessarily be provided with a degree plan by the institution, which shows the quantity and quality of content needed to earn a degree. This degree plan will typically be updated by the institution, as content is generated and assessed by the institution, showing what focus-related content has been provided, and what content remains to be provided. An example of a focus credential degree plan is provided in FIGS. 5A and 5B.

Related to the assessment process and the degree plan, an institution can provide course focus credential templates. For instance, a standard template can include a course title field, fields for required activities such as essays, discussion, slides, and projects/other, and a set of focus credential required activities for that particular course, for which student generated content can count toward a focus credential. For example, students can use such templates to plan their course content, and instructors and other assessors and administrators can use such templates to verify how much focus content credit can be awarded for different student content-generating activities. An example of a partial focus credential course template is provided in FIG. 6. Also, course templates can vary in how much content a student can count toward a particular focus, depending on what the course and the focus area is. For example, an institution can be able to count more individualized content from an accounting course toward an accounting focus credential, than from a marketing course.

Additionally, or alternatively, an institution can provide a special course, somewhat akin to a portfolio assessment course, in which the student assembles archived focus content, which he/she has generated across a range of major and non-major courses, taken at the institution or elsewhere, for assessment by the institution to determine eligibility for a focus credential and/or for a focus credential in a particular micro-focus area, and/or to provide support for a particular focus credential area and/or name not yet explicitly approved by the institution. This course or a similar one with portfolio assessment characteristics can also be used to assess non-collegiate experiential learning by the student in the focus area. This focus assessment course can be for-credit or not-for-credit, and a fee may or may not be charged by the institution. Furthermore, if content is deemed to be lacking in some respects during the final assessment process, this or another special focus-content-generation course can be provided, which can be taken as an independent study course described earlier to develop content satisfactory for earning a focus credential. See FIGS. 5A and 5B for an example of how these special courses could fit into the student's degree plan. See elsewhere herein for additional details.

Using various aspects of information and communications technology (ICT), often combined with manual sub-processes, and related activities, a computer-based system can be used to select and market keywords associated with focus credentials, which relate to the focus area, and for which the institution could provide a focus credential. Information databases, including but not limited to job trends forecasting, such as by the Bureau of Labor Statistics (BLS), government and other degree program statistics and forecasts, data analysis, advocacy and predictions by trade associations, think tanks, industry groups, other non-profits, etc., as well as competitive analysis of other institutions' offerings, student, alumni and/or employer input including focus group or surveys, and related market research, brainstorming, etc. can be analyzed, typically through a combination of computer-based and manual processes. The institution or third-parties can purchase rights to those focus-related keywords, which can bring significant traffic, leads, and applications for admission to enroll in focus-related programs. In a related manner, Web sites whose visitors are more likely to have interest in those focus credentials could be identified, and appropriate marketing communications provided at those Web sites to reach prospective focus credential students. This process can proceed iteratively, with a series of manual and automated activities, as needed.

In the illustrative example of a Focus in Automotive Dealer Public Relations, the institution or third-parties can acquire rights to, but are not limited to, the terms "bachelor's degree" and "master's degree" when occurring in Google®, Yahoo® or Bing™ searches together with "public relations" and "automobile dealer", and/or in combination with a wide range of "horizontal" micro-focus area terms, such as "crisis communications", "corporate relations", "community relations", "employee communications" and "vertical" micro-focus area terms, such as "automobile industry," "automotive dealerships", and "car advertising", and even geographic area terms, such as Midwest, Southern California, New York City, or Asia. Virtually any terms related to potential job or skill function, industry, geography, or other horizontal, vertical, and other content areas of interest can be combined and marketed, as long as the institution can provide a related focus credential with academic integrity. Since institutions which do not offer a focus credential typically cannot offer academic credentials in such narrow combined emphases of studies, the competition for and cost of these word combinations can be much lower, than for generic terms such as bachelor's or master's degrees combined with other broad terms alone, such as "marketing" or "public relations" or "advertising". This provides the institution offering focus credentials with unique value-add to prospective students, while recruiting those students at lower cost than recruitment for more general, prior art programs. Please see elsewhere herein for more details.

This disclosure in at least some embodiments includes a novel academic program structure. This novel academic program structure apparatus, referred to as the "focus structure" or "focus credential structure," enables construction of an academic credential primarily with content generated by individuals ("individualized content") from parts of multiple courses, in effect transforming separate pieces of multiple courses into a distinct novel credential, rather than a traditional credential being constructed with whole courses (course-based or "course-centric"). This structure apparatus is referred to as an individualized-content-centric structure or simply focus structure, in contrast to the prior art course-centric structure. The focus is not a totally separate credential from traditional academic credentials, but instead typically transforms those credentials by identifying and officially certifying a narrower learning emphasis within the traditional, broader academic credential for the broader degree, such as an associate, bachelor's, or master's degree, and a primary field or program of study, such as an undergraduate major, or master's or other graduate program of study. In effect, the focus structure takes a more general degree program and adds a narrower emphasis in a particular area; this transforms the degree from a more generic degree to a more focused degree, which provides both a broad traditional credential as well as more narrow emphasis credential. This academic structure apparatus permits the student to earn what is referred to here as a "focus credential," using the model and processes described herein. In turn, the focus credential can be created, implemented and marketed by an institution, often in conjunction with third-parties, using systems and processes described herein.

From another perspective, this academic structure transforms scattered pieces of student-generated content from a plurality of separate courses into a coherent academic whole, valid for earning an academic credential, presenting an opportunity through the student's academic program for the student to demonstrate significant understanding and competency in a particular area, which is the basis for granting the focus credential.

In the prior art, a student earns an academic credential by meeting academic requirements consisting of lists of courses. This is true for example of associate, bachelor's, master's, and even to a significant extent doctoral programs prior to dissertation work, as well as for academic majors, minors, concentrations, specializations, and other prior art traditional primary and secondary programs of study within degree programs. The student can in some cases use "course equivalents", typically courses taken at other institutions which provide the same basic knowledge as the required course, or can complete tests, or "portfolios" demonstrating knowledge based typically on on-the-job experiential learning, or other evidence, to prove that the student has learned equivalent knowledge to the required course. In limited cases, the student can use independent study, directed reading, honors research, or other more open-ended courses as part of the academic program to qualify for a prior art credential as well. In all cases, to qualify for the prior art academic program credential, required courses must be taken or evidence for these courses' equivalent knowledge must be provided in a manner acceptable to the academic institution. More details on the prior art are provided elsewhere herein.

For this new focus credential structure and processes, however, the unit of measurement to build the focus academic credential is no longer a whole course, but part of a course, and specifically, the part of the course used is the content generated by the individual student, also termed the individualized content. To reiterate, in the prior art, an individual's content is only used indirectly toward a degree program credential, as part of fulfilling the requirements to complete a course, which course is used directly to build an academic program credential. In contrast to that prior art, with this structure, the individually-generated content within a series of courses, which is related to a particular topic/area, even though it is only part of the courses taken, can be used toward a new kind of academic credential, made up of parts of courses of widely varying size and format, rather than whole courses. Furthermore, these parts of courses can be from courses in widely varying subject areas, and these courses can in many cases not be inherently related to the focus area. This cumulative individual content in a particular area across multiple courses during the academic program of study, is termed a focus.

Today, there are many academic institutions, including very aggressive for-profit institutions that could have made substantial money by introducing the focus credential. Many of these for-profit and other institutions with working adult programs require students to provide individualized content, which shows that students can apply course theories and concepts to their particular area of career interest. So individualized content is being provided by students, but no additional credentialing beyond traditional course-centric major, minors, concentrations, etc. are being provided by the institution to acknowledge this cumulative learning in a particular area. In addition, the market is very competitive, with over 4000 accredited higher education institutions, so if the focus credential model was obvious, it would have been developed and marketed already by institutions seeking to differentiate and add value to their degree offerings. Yet none of these institutions have introduced anything like the focus credential described within the present disclosure, and likewise we do not know of any remotely similar concepts, patents, etc., which have been developed by any individuals or institutions or other organizations.

Generally described, the present disclosure relates to course and degree offerings in academic institutions. More particularly, it relates to an optimized academic credential structure apparatus and implementation and marketing and other activities model and processes with academic integrity, for existing or new programs at regionally and nationally accredited and other postsecondary, higher education institutions. In one illustrative embodiment, a developed and highly innovative computer-enabled Internet-optimized academic credential model and process, with academic integrity, for existing or new programs at regionally and nationally accredited and other postsecondary higher education institutions is provided. This model allows a postsecondary student to earn an individualized credential within existing academic program formats, by using standard course essays, presentations, synchronous/"live" or asynchronous/non-live discussions and other class participation, and other typical course homework projects, interactions, tests, assessments and other learning evidence to demonstrate knowledge of a particular content area, i.e., a focus area, distinct from existing majors, minors, concentrations, etc. This credential, as described in the present disclosure, is termed the focus credential, though institutions can choose different terms for it, including but not limited to emphasis, specialization, depth, or other terms. Hereafter, the model can be referenced as the focus credential model or system.

The institution in many cases can offer a focus combined with traditional academic undergraduate and graduate degree offerings, for example, a BA in business with a focus in automobile marketing or automotive dealer public relations, or masters of education with a focus on inner city elementary school teaching or even teaching reading in inner city schools to immigrant English language learner children. A small exemplary list, which gives an insight into the very broad and deep potential for focus credentials, is found in FIG. 3. Academic integrity can be ensured by internal governance, policy-setting, and academic review processes as well as external authorities, since institutions which are likely to be interested in offering focus credentials typically are accountable to their mission, faculty, board of trustees, and accrediting bodies for their academic quality, assurance of adequate student learning, and other quality control measures.

In many cases, an institution works with or benefits indirectly from independent third-parties, which perform marketing and student recruitment-related services and other activities that are of use to the institution. Throughout this disclosure, when the term institution is used, this can include services provided by third-parties working directly or indirectly with the institution, which can support the institution's academic, assessment, student services, marketing, recruitment, and related needs and activities. Many additional advantages of the present disclosure will become apparent to those skilled in the relevant art as provided in the descriptions herein.

Figure 7:
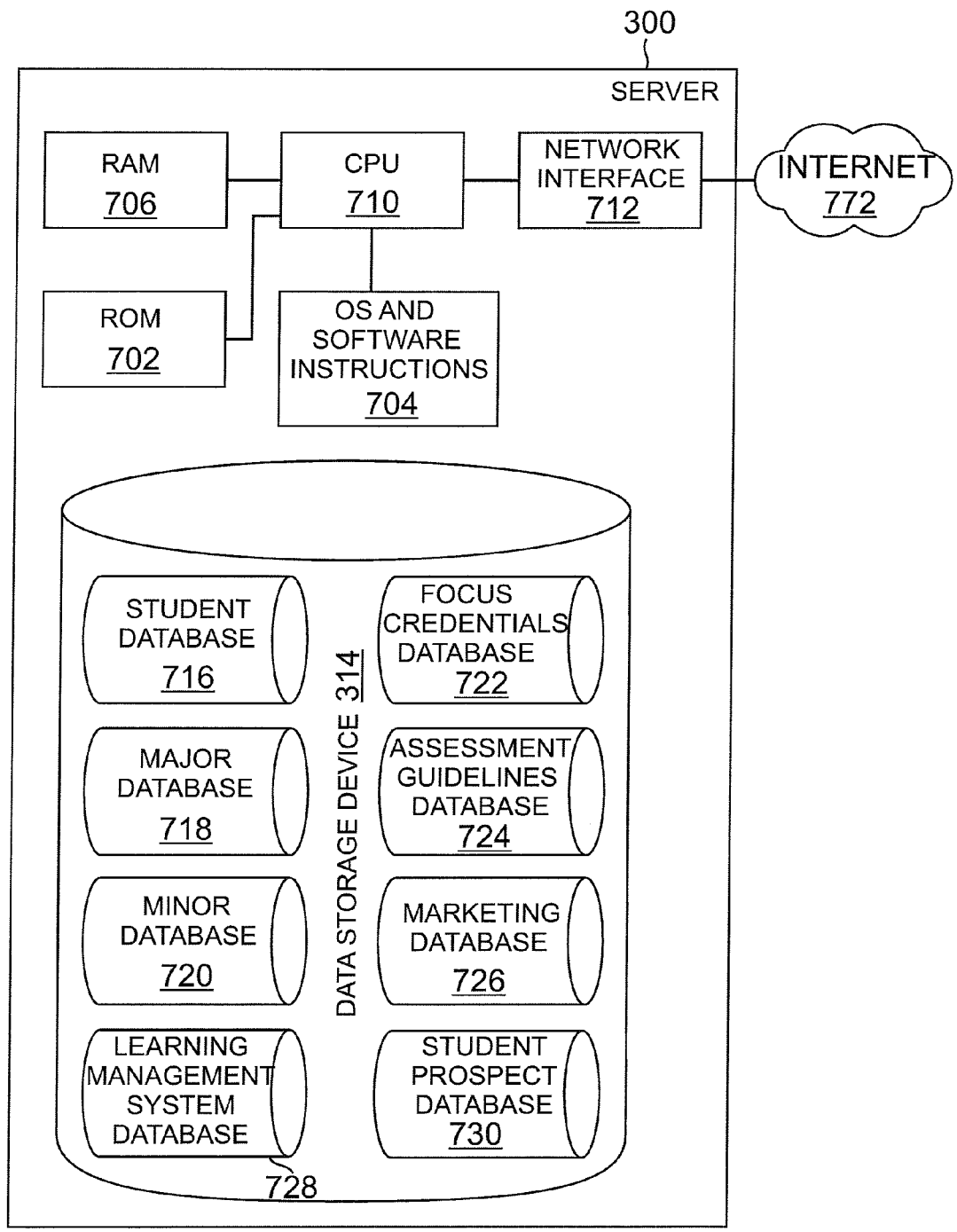
FIG. 7 is a block diagram representing illustrative hardware and software for a server in accordance with one or more aspects of the present disclosure.
Figure 8:
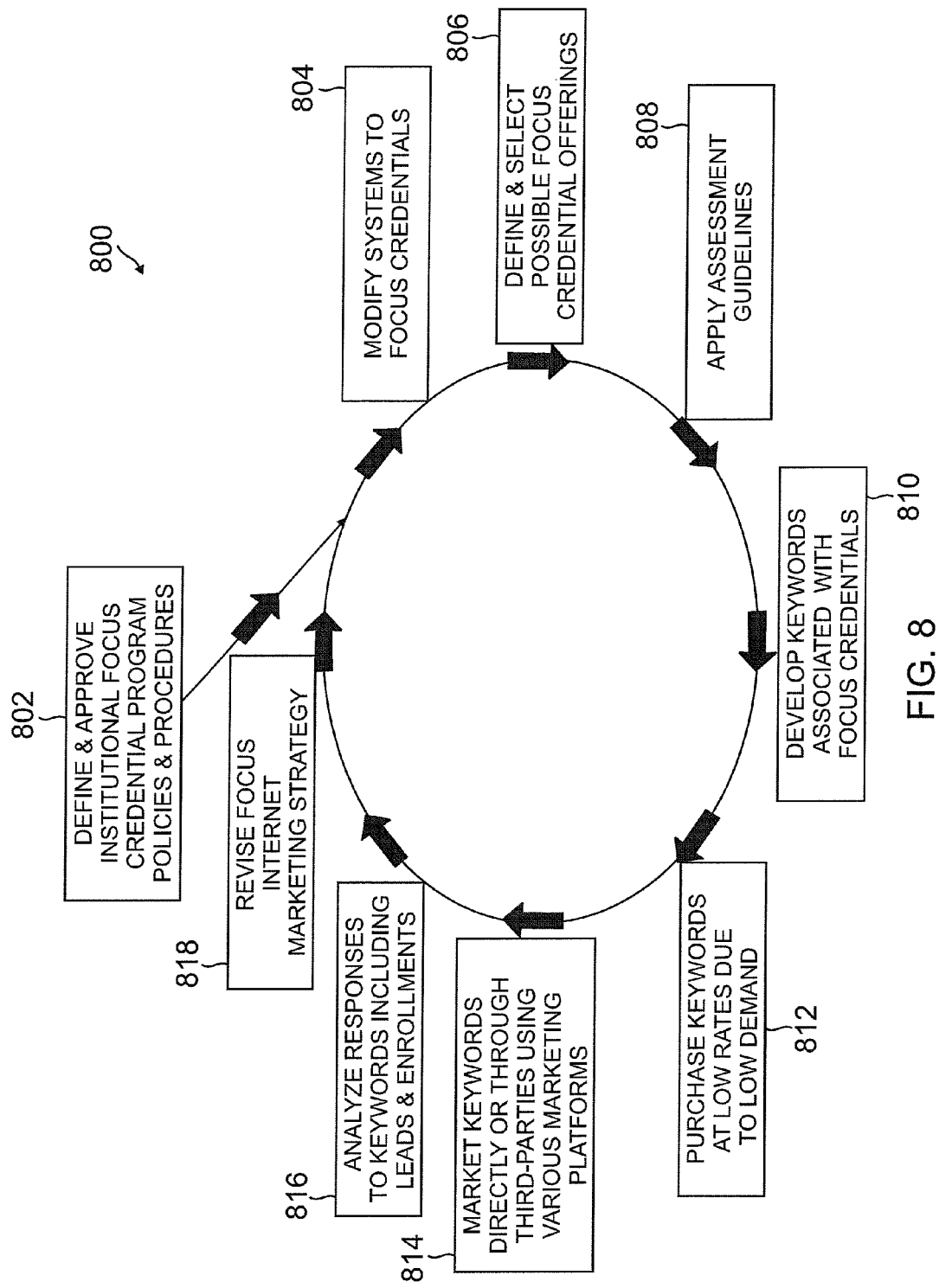
FIG. 8 is a flow chart showing exemplary processes for developing and marketing the focus credentials in accordance with one or more aspects of the present disclosure.
Figure 9:
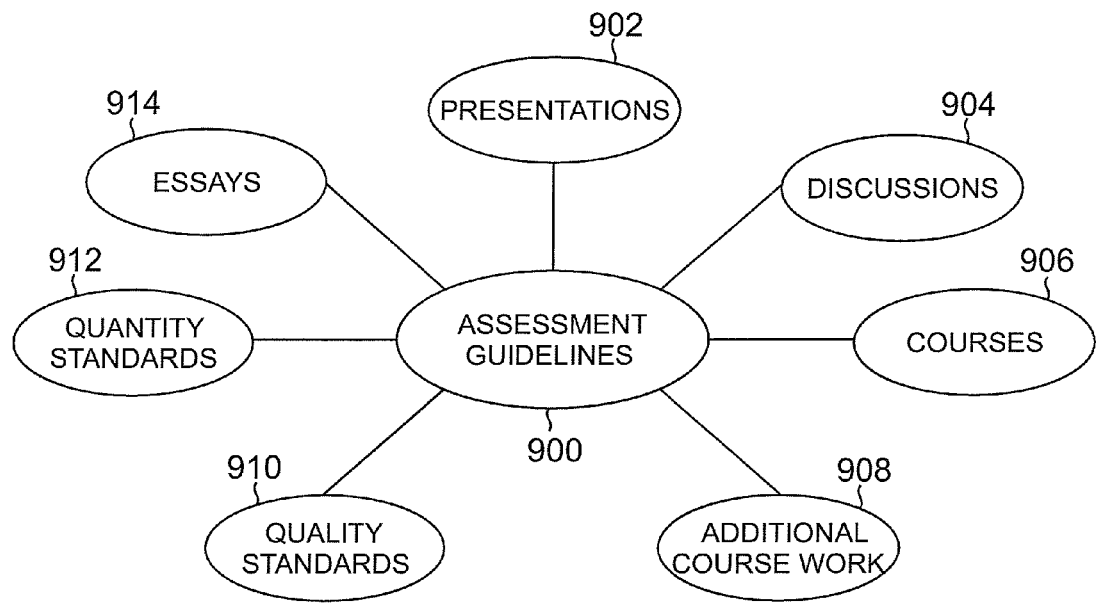
FIG. 9 is a block diagram showing exemplary factors contributing towards assessment guidelines in accordance with one or more aspects of the present disclosure.
Figure 10:
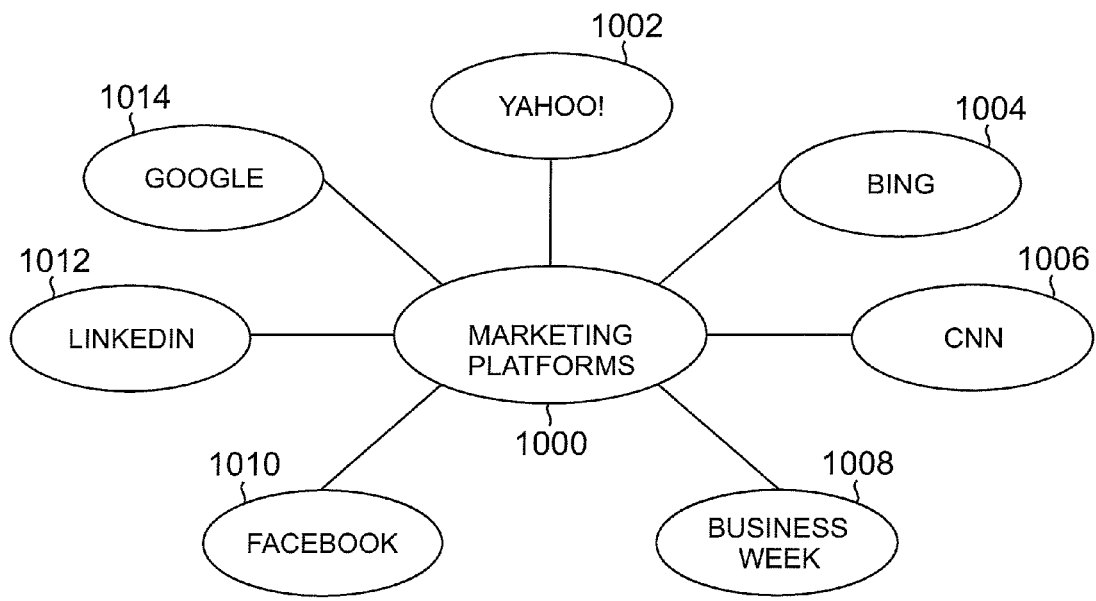
FIG. 10 is a block diagram providing exemplary marketing aspects using the focus credentials in accordance with one or more aspects of the present disclosure.
Figure 12:
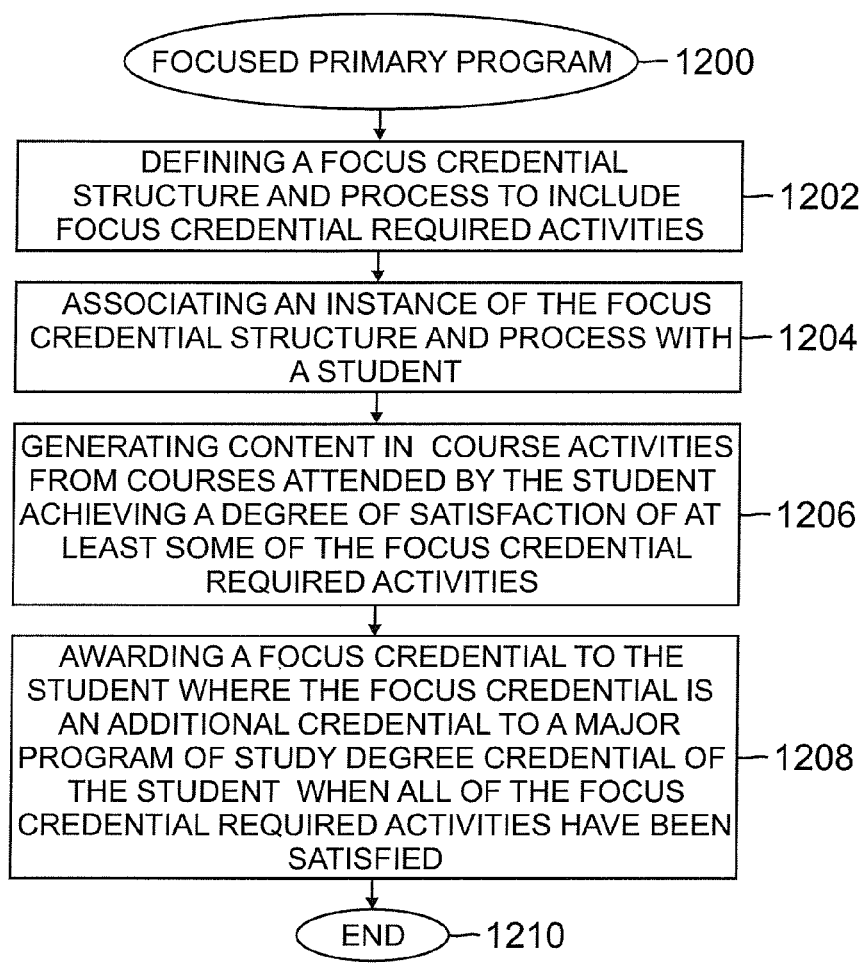
FIG. 12 is a flow chart illustrating processes in a focused primary program in accordance with one or more aspects of the present disclosure.

Before describing further embodiments of the present disclosure, a prior art description of offered academic programs will be described in FIG. 1. Following that, exemplary individually generated ("individualized") course content from multiple non-major and major courses are provided in FIG. 2. This content is combined in a focus credential, and illustrative but not exclusive focus credentials are listed in FIG. 3. FIG. 4 provides illustrative but not exclusive course assessment and status summaries for content completed to qualify for a sample focus credential. FIGS. 5A, 5B and 6 provide an illustrative but not exclusive degree plan, showing how a student can generate additional content to finish completing a sample focus credential. FIG. 7 depicts illustrative but not exclusive hardware and software for implementing the focus credential model. FIG. 8 provides an illustrative but not exclusive model for creating and marketing the focus credentials, while FIGS. 9 and 10 illustrate exemplary individual components of the focus credential model. FIG. 11 is a depiction of exemplary marketing costs and competition. FIG. 12 through 18 are illustrations depicting embodiments in accordance with one or more aspects of the present disclosure. It should be understood that there are many ways that someone skilled in the relevant art could construct a multitude of focus credentials and related activities and variations on these processes.

Turning now to FIG. 1, a prior art block diagram representing majors 100 and related concentrations in accordance with one aspect of the present disclosure is provided. Within typical majors 100 are major courses 102 that must be completed. For example, a student majoring in computer engineering must complete courses 102 in microprocessors, circuit design, firmware, embedded microcontrollers, VLSI chips, analog sensors, mixed signal circuit boards and operating systems. Institutions can also provide independent study courses 104 that are related to the major 100. The independent study courses 104 can provide credit towards the major 100. Generally, the independent study courses 104, which can include directed reading, capstone, and similar courses, are part of an agreement between the student and professor who agree upon a topic for the student to further study, outside of a normal more rigidly structured multi-student course format, with limited guidance from the instructor for an agreed upon amount of credits, in accordance with institutional guidelines.

Honors and honors research courses 106 related to the student's major 100 can also be provided by an institution. Honors research courses 106 can be taken, typically as part of preparing an honors thesis. Some institutions have defined minors or concentrations, which are occasionally called specializations, focuses or emphases. However, these credentials almost always require specific types of concentration courses 108 with particular content, with particular course descriptions and often detailed course specifications. In order for other content from courses with different names to be used toward any traditional credential, they typically must be course equivalents to the specified courses, with similar course descriptions and subjects covered by the course, or the student must test out of the course by showing mastery of the standard course content required for the institution's credential.

In contrast to the prior art for academic credentials, the focus credential can allow individually-developed course content from any course to be used toward the credential, thus making it individualized-content-centric rather than course-centric. Focus credentials expose a major weakness in prior art academic credentials. While prior art academic credentials can in theory be content-based, in reality they are course-based. While prior art credentials claim to reflect the student's knowledge of a certain content area named in the credential, in reality, the content is only measured indirectly through the courses taken. As a result, a large body of knowledge demonstrated by the student in the student's individually generated content, particularly in working adult degree programs with a heavy application focus, is not credentialed by the institution. In the prior art, this individualized content within a standard course is only recognized by the institution toward its credentials indirectly, only in so far as it is reflected in the standard course content, as part of meeting standard course requirements. The only exception in the prior art is if the individualized content is part of independent study-type, honors or other research, "capstone", or "portfolio" courses, which are specifically designed to assess individualized content, though in any event this special individually-generated course content only counts toward the prior art academic credential as a whole independent study, honors research, portfolio, etc. course, and it remains a course-centric part of prior art course-centric program credentials.

In cases where institutions offer credentials that allow individualizing, such as the Charter Oak State College individualized concentration, the individualized concentration credential is still assembled from a set of courses. In this prior art, the individual student can propose which courses to include in the individualized concentration and perhaps even the name of the concentration, but cannot use content toward the concentration from within a range of courses that are not specifically included in the concentration. In contrast, the focus credential can include content from virtually any course the student takes, even if the course description has nothing to do with the focus credential or the major or minor, and even if the course itself is not included in a prior art major, minor, concentration, specialization, or similar traditional credential program of study.

Some institutions grant credit for demonstrated prior non-collegiate college-level learning, typically experiential learning based on the student's on the job learning. Often the student must put together detailed information, termed the student's portfolio, as part of the "prior learning assessment" process, in order to demonstrate that what the student learned through non-collegiate methods before enrolling at the institution was at the college level, typically through on-the-job "experiential" learning. The amount thereby learned that is documented through the portfolio process is then matched to a corresponding standard college course "equivalent." Credit can then be granted at the new institution, which the student is attending, for this prior college-level learning. However, this portfolio-assessed learning does not typically lead to a named credential at the institution, and at any rate, unlike focus credentials, portfolio assessment cannot be used for student work done in the institution's courses, which the student takes after enrollment at the institution, because course content is only considered for credentials in the form of whole courses. Instead, new experiential learning while enrolled at the current institution is only counted for credit indirectly, insofar as it fulfills part of a course requirement which includes on-the-job learning, or directly, as a distinct on-the-job learning course typically required for some traditional vocational-technical degree credentials.

In cases where the institution uses a "capstone" or similar course or comprehensive assessment as part of earning a credential, this is meant to demonstrate adequate mastery of the knowledge required for the degree program, but does not use the actual individualized content itself from previously taken courses toward the credential. In contrast, the focus credential allows the student to assemble focus-related content from any course, including general education, elective, non-major and other courses, to aggregate to make up the focus. As shown in FIG. 2, obtaining focus credentials is not dependent on courses per se and certainly not limited to major courses 102, independent study courses 104, honors research courses 106 or concentration courses 108 within the student's major 100. For example, general education courses 202 can be used to provide content in a focus area, e.g., essays 204 presented for general education courses 202 can be used to provide evidence in a particular focus area, as part of supporting the student earning a focus credential.

Elective courses 206 can also be used to provide content in a focus area. For example, presentations 208 provided within the elective courses 206 can be used. Major courses 102, independent study courses 104, honors research courses 106 or concentration courses 108 can also be used to add content to the focus credentials. Within these, projects 210, discussions 212, essays 204 and presentations 208 and other activities can all be used. One skilled in the relevant art will appreciate that focus credentials are therefore not determined only by any specified or special whole courses, but instead developed to a significant extent through other methods.

To reiterate, focus credentials mark a significant transformational break from the prior art of structuring academic credentials in academic institutions shown in FIG. 1. In the prior art, the course itself was the building block for any credential. As a result, even when individualized content is permitted beyond standard courses to earn a prior art academic credential, this individualized content is accommodated in specialized independent study, directed reading, honors research, on-the-job-training, or similar courses, i.e., still requiring a whole course to count the content, and using the course-based credential model.

To reiterate further, the focus credential allows focus-related content from any course to be used, whether the course description or standard built-in course content has anything to do with the focus credentials or not. The student develops his/her own content in a particular focus area as part of meeting the course requirements, typically by applying the course theories and concepts to his/her own career or personal interests in course assignments and other activities. For example, only one student in a particular course might have appropriate content to count toward a particular focus credential. Other students' individualized content, who took the same course, but focused their essays, presentations, discussions, and other individualized course content on an entirely different industry, functional area, geographic area, or other focus area, than the content area covered by the one student's focus credential, cannot use their individualized content toward the same focus credential as the one student. FIG. 4 includes a table which represents part of an individualized content database in a simplified form. While shown in a simplified form, it should be appreciated that in a working system, the database can take any of several different forms and in fact would likely have a far more complex structure. The exemplary simple form is used in order to simplify this explanation. In FIG. 4, the database can include five columns including an Activities column, a Student's Work Description column, a Pages/Comments/Slides/Equivalents column, an Instructor's Comments column and a Provisional Grade For Focus Content column. Other columns known to those skilled in the relevant art can be used.

The Activities column lists activities and courses in which those activities occurred. For instance, a first entry in the Activities column indicates "Essay—Persuasive Writing," indicating that the student associated with the database has completed an essay in a persuasive writing course that has been applied to the focus credential required activities. A second entry in the activities column can indicate that the student has completed an essay in a creative writing course, and so on. The Student's Work Description column can include a separate instructor comment for each of the activities that appears in the activities column. For instance, for the persuasive writing essay in activities column, the student work description column includes the description "Memo to Auto Dealer on Using Public Relations Effectively". This description can help the student and/or assessor remember the content of the essay as well as why the content is related to the focus credential, to which the content is being applied. The Pages/Comments/Slides/Equivalents column can include a separate entry for each activity that appears in the activities column. For instance, the number of pages can be listed. In addition, each course name and course activity can be hyperlinked to the actual course content generated by the student. This facilitates recollection and assessment of focus content, after the course has been completed. Instructor comments can be provided that allow specific comments about the student's work.

Turning to FIGS. 5A and 5B, a degree plan, is comprised of a list of how much focus content a student has generated in particular courses with particular activities, and in addition shows remaining courses and potential activities for the student to generate more focus content. Focus credit earned to date can be provided within the chart. Essays, discussions, slides, projects/other, description/comments, provisional grades for focus content and course grade can all be reflected. Potential focus activities can also be provided such that new sources of obtaining credentials can be listed.

With reference to FIG. 6, a detailed list of course activities available to a student in a particular exemplary course embodiment that can be used toward a focus credential, helps the student plan accordingly. This type of list also assists instructors or other assessors in evaluating content usable toward a focus credential. For instance, a total of six different activities are available during the first two weeks, as indicated in columns 2-4. Of these, there are one essay activity, four discussion comments activities, and one presentation activity, with varying amounts countable toward a focus credential. If the student creates his/her content in the focus area using those activities, the student can be eligible to count a certain number of pages/comments/slides/etc., toward earning the focus credential, subject to certain maximums, and to assessment, as in FIG. 4.

In addition, for example, though this is not shown in the FIG. 6, the requirements for later weeks of the course could specify that at least one of the essays needs to be at least 10 pages or 3000 words long, that the other two need to be at least 5 pages long, that one of the presentations needs to last at least 10 minutes and include 10 PowerPoint® slides, and the other two presentations need to be at least 5 minutes long, etc.

The intent is that in certain embodiments, for any focus credential offered by an institution, the template requirements need to be met, and then a student can figure out how to meet the requirements. This template concept would likely be needed to simplify the system overall. It can also be in certain embodiments that there are two or three standard templates, where each standard template is different and has different requirements. Some can be more difficult and confer a higher focus credential than other simpler templates—nevertheless at least there would be some standard structure so that all focus credentials have at least some level of required work in common. Note also that a single template can be used for one course generically for thousands of focus credentials, and the course activities template need not be customized for each focus credential.

With reference now to FIG. 7, a block diagram representing illustrative hardware and software within a server 700 in accordance with one aspect of the present disclosure is provided. The server 700 typically takes the form of a computer server, and more specifically a web server. The server 700 can process focus credentials and track them through a student's career at an institution. The server 700 can include ROM 702, operating system and software instructions 704, RAM 706, central processor (CPU) 708, network interface 712 connected to the Internet 772 and data storage device 714. A conventional personal computer or computer workstation with sufficient memory and processing capability can be used as the server 700. Alternatively, multiple interconnected servers can also serve as the server 700.

The server 700 can be able to handle high volumes of transactions and large amount of queries for communication and data processing. RAM 706 and ROM 702 are used to support the program codes that are operated by the CPU 710. The memory can be in a form of a hard disk, CD ROM, or equivalent storage medium. The CPU 710 can support the authentications such as communications from external data servers, as well as allowing for anonymous transactions and general data encryption.

The data storage device 714 can include hard disk magnetic or optical storage units, as well as CD ROM, CD RW or DVD ROM and flash memory such as compact flash and secure digital cards. The data storage device 714 contains databases used in the processing of transactions including student database 716, majors database 718, minors database 720, focus credentials database 722, assessment guidelines database 724, marketing database 726, learning management system database 728 and student prospect database 730. Data can flow from each of the databases and can be interconnected through logical or physical connections.

The student database 716, which can also be part of the institution's student management system (SMS), can track information pertaining to students enrolled at an institution. The student typically creates information about themselves, for example, the student's permanent address, contact information and other personal information where it can be stored within the database 716. The database 716 can also maintain other information such as the student's grades, where they are living at, relatives, and current addresses. The data store device 714 can include a majors database 718, which can also be part of the institution's learning management system (LMS) database. The database 718 can store information about majors and their associated courses. The majors database 718 can be linked up with the student database 716 such that each student within an institution can be paired up with at least one major. The majors database 718 can be used to store information about courses needed to complete a major, while a minors database 720, which can also be part of the LMS, can be used to store information about courses needed to fulfill a minor and be linked with the student database 716.

Focus credentials database 722 can be used to keep track of information regarding focus areas that students within the institution complete. The focus credential database 722 can be linked with the student database 716 described above. An assessment guidelines database 724 can be used to monitor completion of the focus credentials. A marketing database 726 can also be provided within the data storage device 714. A learning management system database 728 can be provided, for which operations are described above. A student prospect database 730 can be provided, with information on prospective students interested in enrolling and the programs of study including possible focus credentials they can be interested in.

The server 700 can include a network interface 712 in order to communicate with other components over the Internet 772. For example, students trying to access the server 700 will typically log in through the Internet 772. As another example, third-parties can access server 700 and student prospect database 730 and marketing database 726, typically through the Internet 772. Conventional internal or external modems can serve as a network interface 712. A cable or DSL modem can be used as a network interface 712. The network interface 712 can support modems at a range of baud rate from 2400 and upwards.

While the above embodiment describes a single computer system acting as the server 700, the functionality can be distributed over multiple computing systems. The databases can also be distributed over a cloud computing environment. In one embodiment, the server 300 is configured in a distributed architecture, wherein the databases and processors are housed in separate units or locations. Some servers perform the primary processing functions and contain at a minimum RAM, ROM, and a general processor. Each of these servers is attached to a WAN hub which serves as the primary communication link with the other servers and interface devices. The WAN hub can have minimal processing capability itself, serving primarily as a communications router. Those skilled in the art will appreciate that an almost unlimited number of controllers can be supported. This arrangement yields a more dynamic and flexible system, less prone to catastrophic hardware failures affecting the entire system.

The technology described herein can be implemented as logical operations and/or modules. The logical operations can be implemented as a sequence of processor-implemented activities executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, activities, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

Turning now to FIG. 8, a flow chart showing exemplary processes for setting up a focus credential model 800 and uses thereof in accordance with one aspect of the present disclosure is provided. While described as some of the key focus model characteristics, and key procedures in the process of providing and marketing the focus credential, those skilled in the relevant art will appreciate that the order presented below does not need to follow as described. Furthermore, fewer or more processes presented therein can be used within the model 800.

To begin, focus credentials are defined and approved at block 802 for the model 800. The focus credential selection process can be used to define focus credentials. The higher education institution, possibly in conjunction with third-parties working with the institution, can decide which focus credentials it is interested in offering. In most cases, the institution can concentrate on potential focus credential areas, which can be associated with the institution's existing or planned future programs of study, though it can also include focus credentials in brand new programs.

Preliminary credential selections can happen through the Internet or other computer-based market research including, but not limited to, reviewing the popularity of various Internet search terms, current or potential demand as evidenced by aggregator Web sites including education-oriented information "portals", social media sites and networks, job trends forecasting such as by the Bureau of Labor Statistics (BLS), government and other degree program statistics and forecasts, data analysis, advocacy and predictions by trade associations, think tanks, industry groups, other non-profits, etc., as well as competitive analysis of other institutions' offerings, student, alumni and/or employer input including focus group or surveys, and related market research, brainstorming, etc., or any other Internet- or computer-related analysis or means. In addition, the focus credentials can be selected from the opinions of the institution's academic personnel or any other means acceptable to the institution, and acceptable to any relevant accrediting bodies or other regulatory authorities for the institution. The institution can often use a variety of these computer-enabled and manual selection methods in different ways, and in combination with each other, and in an iterative process.

The focus credential selection process can typically be a continual or at least periodic process. This is not a one-time event, as market research results, Internet and other computer-based marketing alternatives, consumer needs for higher education, institutional perceptions, goals, and processes, the economy, industry dynamics, employer needs, technology, actual demand for particular focus credentials or other degree credentials, and other factors impacting higher education and Internet- and other computer-based marketing and processing evolve.

After initial selection of possible focus credentials, the appropriate governing body or bodies of the institution can approve those that the institution intends to use. In one embodiment, the institution can use its internal processes, which can also involve external reviews and approvals such as by accreditors, to approve one or more new credentials, which are being referred to in this patent disclosure as a "focus" or "focus credential", for use with one or more academic programs. It is expected that the institution can at the same time approve large related groups of focus credentials viewed as appropriate for one or more particular academic programs, but this does not need to be the case.

In one illustrative example, the institution can approve the focus credential area of Construction Management and approve adding it to multiple programs such as Bachelor's in Management and/or Bachelor's in Business Administration and/or Bachelor's in Public Administration, etc. There can also be many focuses related to Construction Management, such as a focus on Office Construction Management or a focus on Home Construction or a focus on Hotel Construction Management. The institution can approve an even broader area related to the construction industry, which can include for example Construction Project Management, Construction Operations, Construction Marketing, and Construction Accounting, as well as Construction Management, or even combine multiple areas across different disciplines into a wide variety of micro-focus areas including for example Residential Construction Accounting Management.

At block 804, current systems are modified to the focus credentials. Focus-related content can be covered in the institution's existing courses, without the need to add additional courses or to substantially alter existing courses, especially in working adult, professional, vocational or technical programs focused on application of theories to workplace practice. These programs typically ask students to apply theories or other more general or abstract concepts covered in the standard course materials, discussions, etc. to specific workplace situations, where the student is employed, or can be interested in working. This can generate significant focus-related content in multiple major and non-major courses, which gets assessed during the normal course cycle.

The student can use typical student-generated course content-creating opportunities, such as essays, presentations, discussions, etc., to demonstrate learning in the focus content area, and to provide assessable content through the course's standard assessment process, without either the institution, instructor or the student needing to do significant extra work beyond the standard course requirements. This "retrofitting" approach on existing programs and processes can substantially reduce the institution's time, difficulty and cost compared to introducing brand new programs for a new academic credential.

The institution can introduce an expanded assessment rubric for tracking and evaluating student-generated individualized focus content. This system enhancement can provide on-going documentation for the student's focus-related work and the institution's assessment of it. An illustrative but not exclusive example of how this rubric can be used is found in FIG. 8, which was described earlier. Those skilled in the relevant art will appreciate that there are a number of ways for institutions to use computer Internet-based means and other activities to cost-effectively assess a focus credential. Continuing with FIG. 8, students are given the ability to define and select possible focus credential offerings at block 806. With focus credentials, new breadth and depth potential is provided to students. Focus credentials can reference virtually any industry, function, geography, subject or whatever-category-or-field content of interest, which can be of relevance to the associated degree program(s) of study. As noted earlier, focus areas, unlike traditional credentials such as majors and minors, are not typically taught in separate, focus credential-oriented courses by the instructor, but rather focused on by the individual student during the course—which itself is typically not dedicated to a particular focus area—by the individual student with an individual interest in the topic of the focus credential. As a result, since the institution itself is not preparing and delivering this student-generated content, it can potentially be operationally efficient and cost-effective as well as academically sound for the institution to approve hundreds, thousands or even potentially millions of focus credentials, when all micro-focus combinations are considered.

The institution can nevertheless also—though it need not as part of this model 800 and processes—teach focus-specific courses, particularly if the institution thought that such courses can attract enough students to be economical, or if such courses were deemed by the institution to be important to teach as part of a particular focus credential, such as for a more professional- or license-oriented focus area, or for other reasons decided by the institution.

The institution can also create, but need not do so for this model and processes, a type of specialized course(s), which can be used for multiple focus credentials by many students, to be used as part of qualification and/or assessment for the focus credential. This course can have some resemblance to a traditional portfolio assessment or capstone course, but the student can typically be assembling evidence from courses taken at the current institution or even previously transferred to the institution, rather than just prior experiential learning as for traditional portfolio assessment courses, to support granting of the focus credential.

As an additional innovation and benefit, the student can add one or more focus credentials or upgrade the previous focus credential after completing the degree program, subject to institutional guidelines. Student can use independent study or portfolio-type courses, or traditional courses related to the new focus credential, or other means approved by the institution, to demonstrate adequate focus content-related learning to qualify for the additional or upgraded focus credential. In the prior art of traditional programs, degree-related credentials such as majors, minors and concentrations, can only be earned and awarded during the main degree program itself, whether undergraduate or graduate. However, the focus credential can be awarded simultaneously with the main degree, or after the main degree, with which the focus credential is associated has already been awarded. In one example, the institution can retroactively assess, whether a student's previous individually generated content during a previous degree program was sufficient to earn a focus credential, which could then be awarded after the main degree had already been awarded. Alternatively, in another example, the focus credential academic work could be performed by the student after graduation, and awarded retroactively on to the previously awarded degree. In this example, in contrast to the prior art, the student can be awarded an academic credential for prior work, which had been performed during the standard academic program, but which was not considered by the institution during the program for separate credentialing. As another example, in contrast to the prior art, the institution can market again to its alumni base, to provide an opportunity to be awarded a credential for work already performed, or to complete additional work related to the already completed program, in order to qualify for an additional credential retroactively tied to the program completed previously. Since the bulk of the focus-related content was generated by the student during the original academic program, the institution and its accreditors can consider it valid for retroactive assessment and awarding.

More than one focus credential can be awarded for the same main degree program, if enough new content in a distinct focus area is generated by the student to qualify for a second or third focus, according to the institution's policies, which are in turn typically subject to accreditor review. These additional focuses can be in a different area than the primary program of study. These varied methods of being awarded focus credentials provide significant benefits to the institution and to the student.

Typically the focus credential can be chosen by the student within the focus content areas approved by the institution, subject to general guidelines provided by the institution. In certain cases, the individual might apply for a particular focus not yet approved by the institution, but for which the institution can have a student-initiated process for establishment of a new focus. The ultimate focus credential program content area and how it is referenced with the focus credential name can potentially be decided by the student, subject to institutional requirements including possibly institutional review of a student's proposed focus credential name and individualized content, and/or the student can choose from a set of the institution's pre-approved focus credential names, as described above. In certain circumstances, for some or even all focus credentials, an institution can require additional coursework, possibly instead of or in addition to specifically focus credential assessment-oriented courses such as those described below, to qualify the student to earn a focus credential. This course or courses might allow the student to for example summarize, consolidate, elaborate on, or in other ways deepen and/or broaden learning related to the focus credential, and demonstrate adequacy of focus-related learning to the institution, similar to a "capstone" course. Alternatively, such a course(s) might be needed to qualify a student for a higher level "significant" focus credential, as described below, but not necessarily in normal focus cases. Furthermore, alternatively, the institution can judge that such additional content is needed for a particular focus credential, such as one related to a professional or vocational area involving licensing or third-party credentialing.

The institution can define different quantities of focus within a particular course, which document how much focus the student must put on the focus area over the duration of a particular course, as part of qualifying for the focus credential. For example, if the student puts a large amount of attention on a particular focus area during the course, the student can have a significant focus on that particular area during the course. If the student puts a moderate amount of attention on a particular focus area, the student can have a moderate focus on that particular area. If the student puts a limited amount of attention on a particular focus area, the student can have a limited focus on that particular area. The institution can choose any terms it deems appropriate, the terms here are used simply for illustration. Diverse levels or terms for those levels can be defined and used by the institution, and are not limited to the provided examples. FIGS. 4, 5A and 5B provide illustrative but not exclusive examples of how an institution can track a student's progress in completing a focus credential, including setting standards for quantities and qualities of student work needed to meet focus requirements, and showing a student how much more individualized content must be generated and assessed to meet institutional requirements. Those skilled in the relevant art will appreciate that there are a number of ways for institutions to use computer Internet-based means and other activities to perform various assessment-related and degree plan-related and other activities.

FIGS. 4, 5A and 5B provide an illustrative though nonexclusive embodiment, which could be for a moderate focus. One skilled in the art can see how the essay, discussions, presentations, and project/other requirements could be varied to accommodate other quality and quantity levels. Within the model 800, at block 808, assessment guidelines are applied. A number of exemplary factors contributing towards assessment guidelines 900 in accordance with one aspect of the present disclosure are depicted in FIG. 9. Because focus credentials are not based on courses but on individual student-generated content within courses, while prior art other methods are based on the course itself rather than individualized content within the course, the focus credentials are assessed differently in material respects than before in the prior art. Assessment of the guidelines 900 can be performed through processes executed within the server 700 using data provided within the assessment guidelines database 724. The assessment guidelines 900 can include, but are not limited to, presentations 902, discussions 904, courses 906, additional course work 908, quality standards 910, quantity standards 912, essays 914 or combinations thereof.

In one embodiment, the institution can use a binary, "pass/fail" approach in assessing the relative quality of the student's work for the focus, in which the work was either adequate or inadequate to contribute toward the focus, in the case of an individual course, or either adequate or inadequate to qualify for a focus credential, in the case of the entire program of study. Alternatively, or in addition, the institution can use a type of graded assessment of the focus work, for which illustrative examples are provided in FIGS. 4, 5A and 5B. There can be a variety of means, by which institutions can assess whether the student's work in existing courses and programs meets the institution's criteria to qualify for a focus credential and a given grade for that focus credential, if relevant.

A course instructor can assess whether the student has adequately addressed the focus credential requirements during the course, typically using institutional focus assessment guidelines 900. The instructor can document and assess the quantity of focus, and whether the student covered enough focus-related content, to ensure that it was adequate for institutional requirements. The instructor can also assess the quality of focus if relevant as part of qualifying for the focus credential or a given grade or other measurement for the focus.

The institution can use ICT systems to evaluate whether and to what extent the student met quantity and/or quality requirements. These ICT-based means can include but are not limited to: counting quantities of focus-related keywords used by the student, counting the number of essays, presentations, discussions, etc., and related numbers of words, sentences, pages, slides, etc., in which the focus was mentioned, using "artificial intelligence" or other sophisticated computer analysis to assess the quantity and/or quality of content related to the focus, or combinations of these, and/or other ICT-based activities judged adequate by the institution.

Student and learning management systems tied to student database 716 enable the proliferation of wide ranges of focus credentials. These systems can automatically track work and progress toward qualifying for the focus credential in a cost-effective manner. Note that online text-based or other discussions and documentation such as essays, PowerPoint® presentations, test results, and other activities, provided in electronic format, which are all common in online courses and programs, significantly facilitate ICT assessment. These data can also be used to improve focus-related marketing, instruction, program delivery, student services, etc., and other activities. Alternatively, ICT-based assessments can be used as an initial or partial assessment, which can also include human-based assessment elements, especially to cover potential shortcomings or gaps of ICT-based assessments. Or hybrid combined processes can be used, in an iterative manner.

All or part of the student's coursework can be reviewed by a special assessor, possibly an assessor with subject area expertise or an assessor with expertise in the process of evaluating focus work, or with other capabilities judged adequate by the institution. This can be done comprehensively by the institution for all students and all of their potentially focus-related work, or partially, or can be done on a random or spot-check basis as an additional quality control, or for specific courses or categories of courses such as general education or non-major courses, or in other special cases such as in order for the student to qualify for special credential qualifications such as a significant focus, or for a professional or license related focus in a content area such as engineering or clinical medicine, which can be a key component of a particular focus, or in another manner and using other activities defined by the institution.

The student or institutional personnel or third-parties can assemble a "portfolio" of the student's work including presentations 902, discussions 904, courses 906, additional course work 908, quality standards 910, quantity standards 912, essays 914 or combination thereof for assessment. This can be saved by the student in the course of the program, and/or archived by the institution or the student and assessed later. This portfolio assessment, which is significantly different from prior art portfolio assessment, which was developed for non-collegiate experiential learning, can take place through a credit or no-credit course, and a fee can be charged. Fees can also be charged for other services related to focus credentials.

Focus credentials can potentially even be used in more traditional liberal arts or other non-explicitly career-related degree programs, in which the student has the opportunity to focus on certain focus-related content during the degree program. A focus credential and its associated learning in a non-career program can in turn provide a more career-oriented credential, than the non-career degree program itself normally can have without the focus. Liberal arts examples can include a BA in English with a focus on Creative Writing, or BA in Sociology with a focus on Public Policy, or BA in Philosophy with a focus on Ethics. In fact, liberal arts-oriented departments or institutions can in this manner maintain their traditional mission and approaches to student learning, while allowing the student to earn a more directly career-oriented focus credential. However, in traditional liberal arts-type programs, certain changes in course assessment options or the use of independent study-type courses to add focus content are more likely to be needed than in typical working adult or career-oriented programs, since liberal arts and similar programs are typically aimed at younger non-working-adult students, are more rigid and pre-set in their requirements including what content the student can contribute, and are less real-life-application-oriented.

Focus credentials can also be used in graduate programs, such as master's and doctoral degree programs. For example, an MBA with a focus on Wireless Services Operations, Master's of Health Care Administration with a focus on Employee Wellness Services, Master's in Education with a focus on Teaching Reading in Inner City Elementary Schools, and many other embodiments can all be provided. Other illustrative but not exclusive examples are provided in FIG. 3.

In addition, when approved by the institution, a student can earn more than one focus credential. This can even include a main and a lesser focus, such as a significant focus in Construction Management with a limited or minor focus in Residential Real Estate.

The institution and/or third-parties working with the institution can, through focus credentials, obtain significant cost-effective access to prospective student audiences, who can be interested in the institution's focus credential areas. The focus areas can be searched by prospective students, or advertised in other ways on the Internet or related networks, including focus-area relevant Web sites and education information portals, marketing through relevant social media, vertical and horizontal market, and career-relevant sites, as well as being direct-marketed to relevant email, telephone or other database lists, etc. In addition, focus credentials with broad appeal can be marketed on more general interest Web pages, such as high-traffic Yahoo, Google, Microsoft/Bing, CNN.com, and other. Web site areas, or in more general interest traditional mass media, such as newspapers, magazines, television, radio, billboards, etc. The focus areas can also be exploited in other computer/Internet-based manners, in such a way that the institution cost-effectively generates large numbers of prospective student leads and converts a significant percentage of those leads to enrolled students.

Returning to the model 800 of FIG. 8, at block 810, keywords are developed and associated with the focus credentials defined above for marketing purposes. Keyword terms related to degree programs are currently used in Internet marketing for degree programs, and many ICT systems and servers and other activities are involved in this process. The focus credential allows for exactly matching credential fulfillment of a wide diversity of prospective students' possible desires, for a very broad range of potential degree credential needs, through the institution's existing curriculum and program structure. The prior academic art only allows a very narrow range of named traditional credentials, such as major, minors, and concentrations, constrained by the institution's course catalog. Existing prior art specializations require specific courses to be completed at the institution to qualify for the typical specialization credential. These traditional course-centric academic credentials can typically only be provided to students through courses in the institution's course catalog, or specific transfer course credits, with specific existing traditional-credential-fulfilling courses.

The prior academic art can therefore only economically support a limited number of named academic credentials for student work, performed while enrolled at the institution. The prior art therefore results in much lower natural and other search "hits," lower response rates to credential-related keyword terms due to non-exact matching of students' desires with available traditional credentials, and related lower conversion of prospective student leads to enrolled students. While academic institutions can currently theoretically advertise many keyword terms and phrases, they can only actually offer a tiny minority of potential marketing keyword terms as actual named academic credentials based on their course offerings, and narrowly targeted keyword marketing will often not be cost-effective.

Since focus-related keywords can be much more detailed and specific than those for institutions' current, pre-named and pre-defined majors, minors, concentrations, etc., there can, in many cases, be much less competition with other education-oriented institutions and third-parties to purchase marketing rights for those very specific keywords, sites, and other opportunities to communicate with prospective students. At block 812, and in FIG. 11, these keywords can be purchased at lower rates due to lower demand. So access to these focus-related keywords, sites, and other opportunities to communicate with prospects will often be less expensive to obtain for the institution and its third-parties, which reduces the cost per lead and/or the institution's cost of converting leads to student enrollments.

Turning now to FIG. 11, this diagram contains a 2×2 matrix, showing how, the more narrowly targeted a focus area is, the less expensive it generally will cost for an institution and third-parties to use search engine marketing and other methods to recruit students. In the left column representing Marketing Cost & Competition, with the bottom row representing Narrowness of Focus, as the Focus becomes narrower as one moves toward the right columns, the cost of purchasing related keywords and marketing the focus credential as well as the intensity of competition go down.

In much marketing of academic programs on the Internet, the prospective student must be motivated to respond to institutional or third-party marketing communications, often by filling out a Web form that provides the prospect's contact information to the institution or third-parties, or via email, online chat, or. Web-initiated telephone call set-up, or other activities. Since the institution offers a named focus credential in the specific content area most desired by the student, rather than simply a somewhat related, more general program area, such as a traditional major, minor, or concentration, the chances of the student submitting contact information to admissions personnel are greater with this focus credential-based marketing model and process. In other words, these focus-related marketing communications are likely to result in a higher response rate than more general keyword terms, thereby lowering recruitment costs considerably than with prior art academic programs and associated recruitment and marketing.

In addition, once the student has communicated with the institution, and the institution has confirmed the nature of the student's desired focus and its close match to the student's specific interests, or possibly even discussing another focus which is an even better fit for the student than the one originally responded to by the student, in discussions by prospective students with admissions representatives or through other communications by the institution or its third parties with the prospect, the chances of the prospective student eventually enrolling are greater with this focus credential model and process. This significantly reduces the cost per new student enrollment, i.e., the "cost per start", in addition to reducing the initial cost of generating a lead, i.e., "cost per lead," described earlier. Those skilled in the relevant art will appreciate that there are a number of ways for institutions to use computer Internet-based means and other activities to cost-effectively find a prospect and gain a response by the prospect. The keywords described above can then be marketed at block 814 of the model 800.

Potential students interested in certain areas of study can search for information on those areas of study on the Internet, through search engines, or in other manners, such as through search functions on non-search-engine Web sites, sites with educational information, blogs, discussion boards or other interactions in online social networks, trade associations, news and media sites, professional and small business networking group Web sites, trade union sites or in other ways. FIG. 10 is a block diagram providing exemplary marketing aspects using the focus credentials in accordance with one aspect of the present disclosure. Marketing platforms 1000 for use with the focus credentials can include, but are not limited to, Yahoo!® 1002, Bing™ 1004, CNN 1006, BusinessWeek 1008, Facebook® 1010, LinkedIn® 1012 and Google® 1014.

Individuals and particularly working adults receive significant value by earning academic degree credentials, which can qualify them for particular jobs, and can lead to higher salaries, promotions, and/or better jobs. Higher education institutions offering focus credentials can deliver and receive significant value by being able to cost-effectively offer a much wider range of degree-related credential options. The nature of Internet search, social media and other Internet characteristics, which provide a wide range of computer Internet-based marketing communications opportunities, further enhances this value, by helping to cost-effectively connect students to their best-match programs, reducing recruitment costs and/or time and effort per student, and/or cost-effectively increasing recruitment potential.

Furthermore, the online program delivery format, as well as allowing specialized demand to be aggregated, and incourse student-generated content to be electronically stored and accessed, plus reducing delivery costs of specialized areas of study, also allows cost-effective marketing of very narrow "niche" credentials such as the focus. As noted earlier, since the institution does not need to offer new courses or programs to meet these needs, but instead can assess student work being done as part of an existing course and program, the number of potential credentials is exponentially larger, while being better suited to specific individual needs than with the prior art. Furthermore, a large percentage of existing working adult programs are structured in such a way that they can allow for "retrofitting" of this focus model 400, which can significantly reduce the cost, time and hassle of implementing the focus credential. This dramatically increases the potential market size and speed-of-roll-out of focus credentials, and the focus credential's attractiveness to institutions.

In one embodiment, the institution can engage in search engine marketing and optimization. The institution, and/or third-parties which can provide services directly or indirectly to the institution, can pay to have its marketing communications presented, when prospective students search using certain focus-related keywords and phrases containing those keywords (in this disclosure referred to as "keywords"). The institution can use focus credentials to further enhance the level and frequency by which the institution's programs are listed by Internet search engines. As discussed earlier, the institution has a significant cost and targeting advantage, when it offers a very broad range of very specific focus credentials, which address specific desires and needs of particular individuals. Theoretically, the institution can be able to provide a focus credential, which exactly meets the student's search request, as well as the post-search-request clarifications of the student's interests and goals provided by the student, often in interaction with the institution's admissions personnel online or by telephone or in-person on in other manners.

In many cases, non-higher education institution third parties develop sites to attract prospective students. They then sell access to those prospects to institutions and/or these institutions' third-parties. These sites typically aggregate education-related information of possible interest to prospective students. The third parties typically purchase rights to certain search terms, various kinds of advertising and marketing on a range of Web sites which prospective students can frequent, and purchase access to and marketing at a range of social media sites, etc., in order to attract prospective students. As described under Internet search above, the institution through these third-parties can cost-effectively reach students, whose educational interests match particular focus credentials. Since the institution with the widest range of specific focus credentials has the best chance of closely matching a particular student's interests, this institution can in many cases be able to generate a higher volume of leads, potentially a relatively lower cost per lead, and almost certainly a lower cost per start, than an otherwise comparable but more general academic program.

Internet search plus many related information aggregation services typically involve a proactive, intentional search by the prospective student for information on education or degree programs. However, many times prospective students are not proactively searching for information through a search engine, education portals, or similar means. For example, prospects can be looking more serendipitously at a variety of Web pages, or not even consciously looking into education but nevertheless be open to education or degree opportunities, when networking with friends or colleagues, which can occur through social networks such as LinkedIn® 1012 or Facebook® 1010, trade and/or networking associations, professional and small business network group Web sites, events, or organizations, trade union sites, specialized magazines and other periodicals, specialized conferences and other events, or in other "social" ways on the Internet and other computer/database-based ways.

The institution, or third-parties, can ascertain through social media what the prospective student's ("prospect's") educational interests and goals might be, and market proactively to the prospect, even if the prospect is not proactively looking at a particular moment in time. For example, when an individual joins a social media or networking group, the individual can complete her/his "profile" describing the individual including the individual's educational background and interests and job and career background and interests, such as LinkedIn® 1012 or Facebook® 1010 profiles. This information can be used to market focus credentials to the prospect.

The institution, or third-parties, can also find out about the prospect's interests more indirectly, through information which indicates the individual's possible interest in education or degree programs, which can be derived from social media and networking sites used by the prospective student, for example based on analysis of the individual's online discussions or other comments. The institution, or third parties, can use data about prospective students to target the prospect with focus-related marketing communications, which match the student's interests and goals, at an Internet location which the student frequents such as a social media or networking site, which is typically familiar, comfortable, and at least somewhat trusted. For example, Facebook® 1010 can know that a particular student works in a particular industry and is interested in getting a promotion or working in a different department, changing jobs, or even earning a higher college degree, based on comments they have made on Facebook® 1010 and/or in their Facebook® profile.

Facebook® 1010 can offer marketers access to this prospective student and other prospects with similar career and/or educational interests through banner advertising, education and/or career-related information or infomercials which generate a response from the prospective students, emails, etc. This access can include the institution or third-parties purchasing banner ads, infomercials or other Internet marketing promotions, which are offered in conjunction with educational information, public relations, discussion boards or other interactions in online social networks, or the myriad other ways available through Internet/computer-based marketing. The institution, or third-parties, through "cookies" or other methods, can allow identification of the student at another Web site which the student visits, and target the student with focus-related marketing communications, which match the student's interests and goals.

Generally, the more narrowly targeted the marketing is on the individual's particular "horizontal" and "vertical" interests, the more likely the individual is to respond. Many career/profession-oriented academic programs are oriented toward "horizontal" multi-industry functions, departmental, and skill set areas, such as Management, Marketing, Accounting, Operations, Sales, Engineering, Design, Project Management, etc. Other academic programs which are "vertical", i.e., typically single industry-specific, often do not specialize in particular segments in those industries, such as for example Health Care Administration, Registered Nursing, Public/Government Administration, Teacher Education, Criminal Justice, or Graphic Arts.

The focus credential provides an opportunity to specialize studies further in particular horizontal or vertical areas or combinations thereof. This in turn provides additional marketing communications opportunities into more narrow "niches". Examples can include Residential Remodeling Construction Contracting and Project Management, Rehabilitation Hospital Accounting, Nursing of Military Veterans with Disabilities, Inner City Elementary Teacher Education in Reading Instruction to English Language Learners, Law Enforcement in High Violent Crime Urban Areas, and Video Graphic Arts for Online Automotive Advertising.

Taking all of the potential category/segment combinations together, potential focuses can include, for example, a focus on Global Hospital Expansion Project Supervision, on Wireless Services Marketing to the US Automobile Industry, or on Senior Administration of Child Abuse Social Services in Alabama, and marketing can be developed using a range of Internet and other alternatives to reach prospective students interested in these potential focus areas.

In addition, there are a number of organizations and Web sites oriented toward particular horizontal and/or vertical marketing services or particular combinations and segments thereof. By developing narrow focuses which provide credentials for learning in very narrow niches, the institution is able to offer a unique credential economically to these potentially small audiences at the intersection of particular horizontal and vertical combinations. Institutions and their third parties can also market through individuals' specialized Web sites, blogs, sites, etc., to reach friends and colleagues and other interested parties, which can have similar interests, yet at very affordable marketing costs.

Many traditional publications such as BusinessWeek plus new media publications such as Huffington Post have Web or other electronic/computer-based presence, such as on iPads or other "tablets", smartphones, e-book readers, "apps", etc. Particular stories they cover, authors/copywriters they publish, sections they offer, etc., appeal to prospective students with particular career, professional, and/or educational interests. By targeting focus credentials at these focus-relevant communications segments, institutions and their third-parties can cost-effectively market as well. Traditional print-based publications or other traditional mass media can also be cost-effectively used, particularly those focused on particular niches, or more general interest publications with issues covering particular niche topics.

Email, mailing and other contact lists provide a significant opportunity to target focus credentials at certain audiences with particular career, professional and/or educational interests. For example, when setting up or modifying a Yahoo!® 1002, Google® 1014, or other email account, individuals can describe their career and educational background and interests, which can be analyzed to determine whether the individuals are prospective students for particular focus credentials.

Traditional mass media and other marketing vehicles and tactics can be used. These can include television, radio, newspaper, magazine, retail store, direct mail, telemarketing, TV and radio spots of different lengths and contents, display ads, classified ads, inserts, coupons, billboards, sponsorships, conferences, trade shows, other events, and other advertising, public relations, direct selling, etc. Similar targeting by various demographic, horizontal, vertical, and other segments or combinations thereof, which match well with certain focus credentials, can create very cost-effective marketing opportunities for institutions.

For example, the institution or third parties can place a display ad and/or insert into the *Journal of Pediatric Nursing* magazine, or purchase mail or email rights or even telephone contact information to its subscriber list, promoting a BS in Nursing with a focus on Pediatric Nursing Services, or it can place TV spots during the King of Queens situation comedy about a UPS-type truck delivery driver, promoting a BS in Management with a focus on Ground Transportation Logistics Management, or a radio or Web sponsorship with NPR during the Car Talk show for an Associate in Business with a focus on Automotive Parts Retail Store Management. The most optimal target media, types of marketing communications, budget, etc. for particular focuses can be determined using computer/Internet-enabled activities, in some cases combined with manual methods.

The institution can use computer/Internet-based research and analysis to determine which media, what type of advertising, direct marketing communications materials, etc. are appropriate, though some manual intervention, and an interactive iterative process, often involving third-parties, will often occur. The prospective student can indicate an interest in the focus-related word or concept associated with the credential, such as by clicking on the search result or a related sponsored search link or advertisement and/or other hyperlink, and/or by completing information about the prospective student, which allows the institution or its third-parties to contact the potential student, and/or in other ways. The student can also go to the institution's Web site, telephone, email, chat system, instant messaging system, send back a reply card, or otherwise contact the Institution in response to the computer/Internet-based marketing communications.

The focus credential model 800 can have the additional benefit of encouraging the enrollment of potential students, who originally may not have contacted the institution or been contacted by the institution because of the focus credential, but whose interest in enrolling increases, when they find out about the availability of the focus credential in the course of their other communications with the institution. Also, the focus credential model 800 can have the additional benefit of beginning communications between a prospect and an institution about the institution's academic programs and how they might meet prospective student needs, even if the prospect ends up not choosing a focus credential and related academic program. Some prospects can eventually choose to enroll at the institution, but not choose to earn a focus credential, or not even choose to enroll in a program that has a focus credential option. Nevertheless, since the institution often pays less for focus-related leads, converting that prospect to an enrolled student can often cost less than prior art marketing communications. The institution can use computer-enabled means and other activities to link its traditional leads and associated recruitment personnel to its focus credentials and related recruiting.

Continuing with FIG. 8, at block 816, responses to keywords including leads and enrollments are analyzed within the model 800. Data on responses by prospective students, including leads and new enrollments in a particular focus area, can be used to revise and expand the keywords, other social engine marketing and optimization, aggregators, social media, vertical and/or horizontal segment-related Web sites, contact lists, types of advertising and/or public relations, traditional media and marketing tactics and materials, etc. at block 818.

Since virtually any focus credential is possible so long as it is adequately related to an institution's academic programs, a very broad range of Internet marketing methods can be used, though only some are worth paying for, depending on their likelihood of cost-effectively producing results, and of course all keywords and other marketing activities must be considered by the institution and relevant accrediting bodies to be academically appropriate. This becomes a continuous improvement loop cycle, based on Internet-generated data analyzed by computer leading to modifications in the marketing communications strategy related to current or potential focus credentials, leading to proposed new focus credentials, etc.

FIG. 12 through 18 are illustrations depicting embodiments in accordance with one or more aspects of the present disclosure. In accordance with one aspect of the present disclosure, a method of transforming a traditional educational primary program of study degree to a focused primary program of study degree is provided in FIG. 12. At block 1200, the processes can begin. At block 1202, the method can include defining a focus credential structure and process to include focus credential required activities. At block 1204, the method can include associating an instance of the focus credential structure and process with a student.

At block 1206, the method can include generating content in course activities from courses attended by the student achieving a degree of satisfaction of at least some of the focus credential required activities. At block 1208, the method can include awarding a focus credential to the student where the focus credential is an additional credential to a major program of study degree credential of the student when all of the focus credential required activities have been satisfied. At block 1210, the processes can end.

Figure 13:
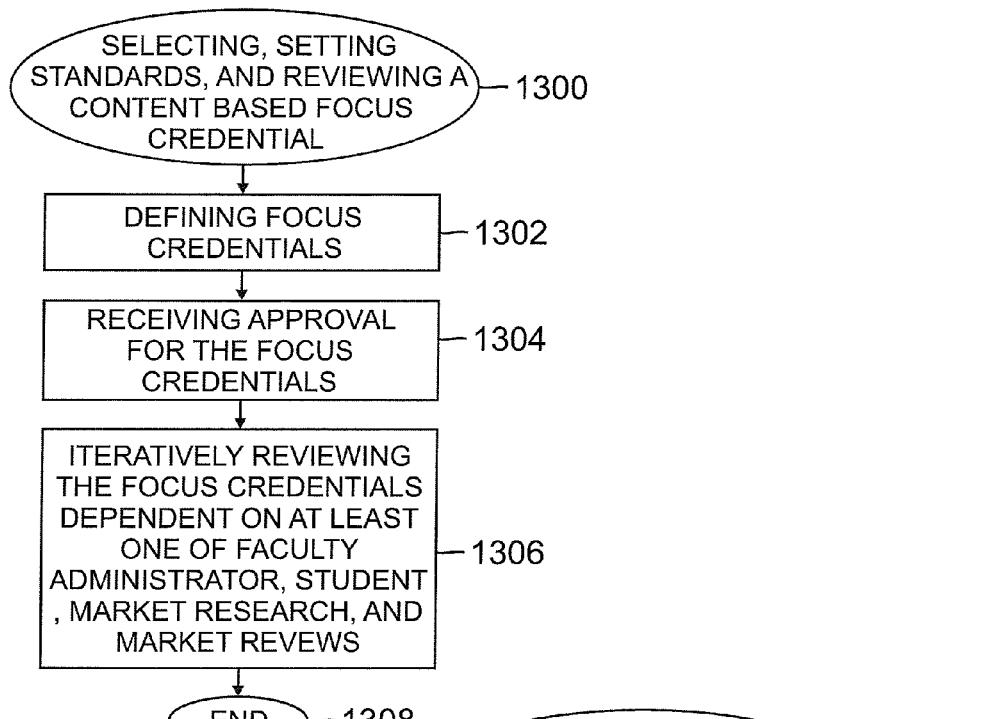
FIG. 13 is a flow chart illustrating processes for selecting, setting standards and reviewing a content based focus credential in accordance with one or more aspects of the present disclosure

In accordance with one aspect of the present disclosure, a computer-implemented method for selecting, setting standards, and reviewing a content based focus credential to an individual is provided in FIG. 13. The processes can begin at block 1300. At block 1302, the method can include defining focus credentials. At block 1304, the method can include receiving approval for the focus credentials. At block 1306, the method can include iteratively reviewing the focus credentials dependent on at least one of faculty, administrator, student, market research, and marketing reviews. The processes can end at block 1308.

Figure 14:
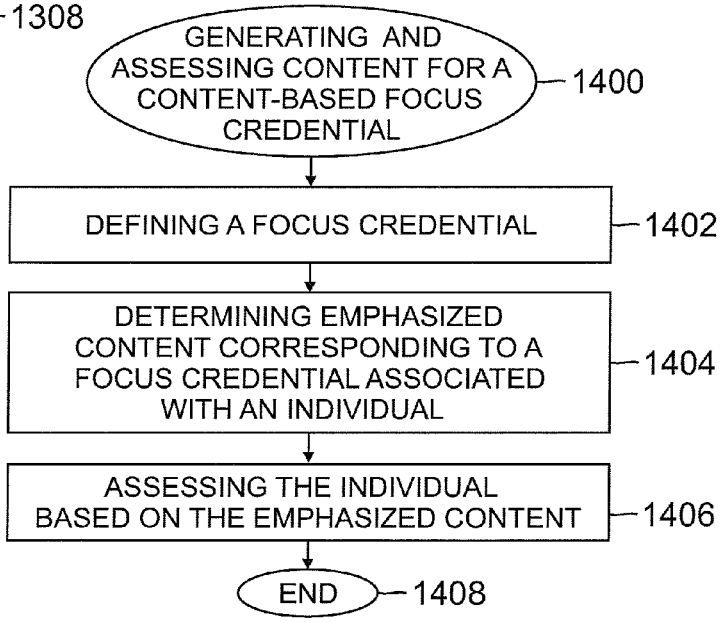
FIG. 14 is a flow chart illustrating processes for generating and assessing content for a content-based focus credential in accordance with one or more aspects of the present disclosure

In accordance with one aspect of the present disclosure, a computer-implemented method for generating and assessing content for a content-based focus credential to an individual is provided in FIG. 14. The processes can begin at block 1400. At block 1402, the method can include defining a focus credential. At block 1404, the method can include determining emphasized content corresponding to a focus credential associated with an individual. At block 1406, the method can include assessing the individual based on the emphasized content.

Figure 15:
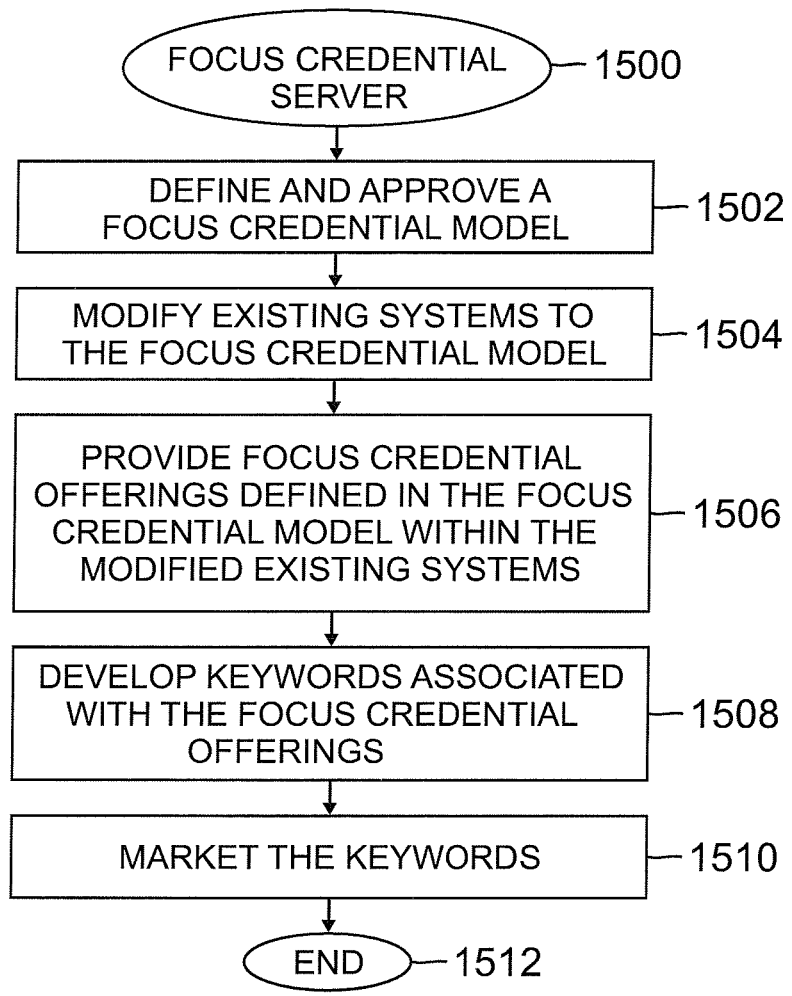
FIG. 15 is a flow chart illustrating processes for a focus credential server in accordance with one or more aspects of the present disclosure

In accordance with one aspect of the present disclosure, processes for a focus credential server is provided in FIG. 15. The focus credential server can include at least one processor and a memory operatively coupled to the processor, the memory storing program instructions that when executed by the processor, causes the processor to perform processes. The processes can begin at block 1500. At block 1502, the processes can include defining and approving a focus credential model. At block 1504, the processes can include modifying existing systems to the focus credential model. At block 1506, the processes can include providing focus credential offerings defined in the focus credential model within the modified existing systems. At block 1508, the processes can include developing keywords associated with the focus credential offerings. At block 1510, the processes can include marketing the keywords. The processes can end at block 1512.

Figure 16:
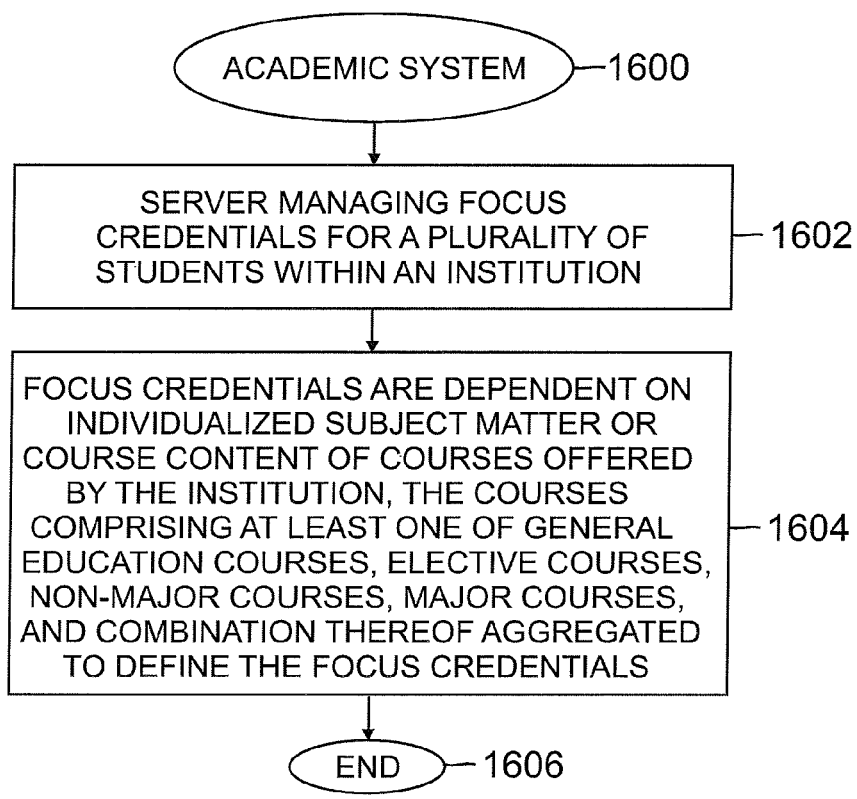
FIG. 16 is a flow chart illustrating processes for an academic system in accordance with one or more aspects of the present disclosure

In accordance with one aspect of the present disclosure, an academic system is provided in FIG. 16. The processes for the academic system can begin at block 1600. At block 1602, a server managing focus credentials for a plurality of students within an institution is provided. At block 1604, the focus credentials are dependent on individualized subject matter or course content of courses offered by the institution, the courses comprising at least one of general education courses, elective courses, non-major courses, major courses, and combination thereof aggregated to define the focus credentials. The processes can end at block 1606.

Figure 17:
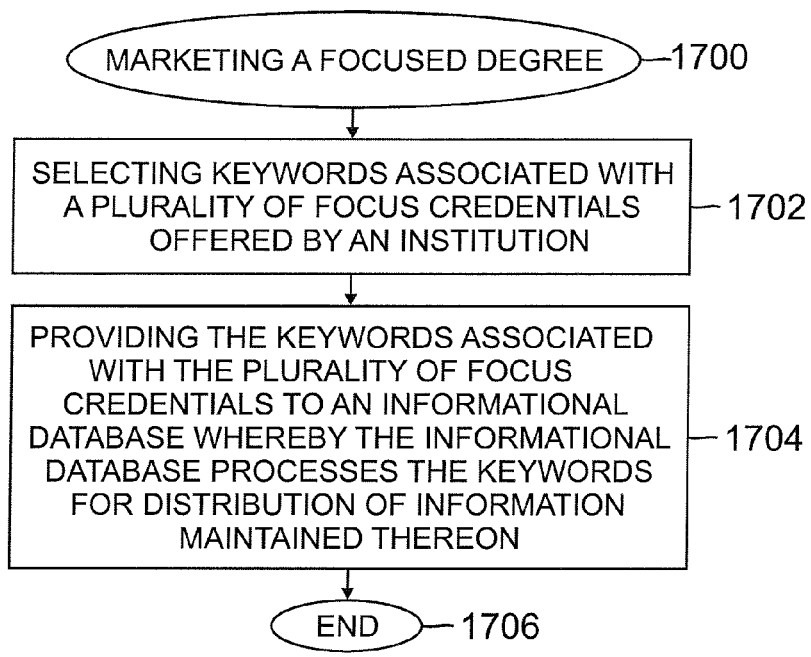
FIG. 17 is a flow chart illustrating processes for marketing a focused degree in accordance with one or more aspects of the present disclosure.

In accordance with one aspect of the present disclosure, in a computer network having at least two computing devices in communication, a method for marketing a focused degree accessible on the network is provided in FIG. 17. Processes can begin at block 1700. At block 1702, the processes can include selecting keywords associated with a plurality of focus credentials offered by an institution. At block 1704, the processes can include providing the keywords associated with the plurality of focus credentials to an informational database whereby the informational database processes the keywords for distribution of information maintained thereon. The processes can end at block 1706.

Figure 18:
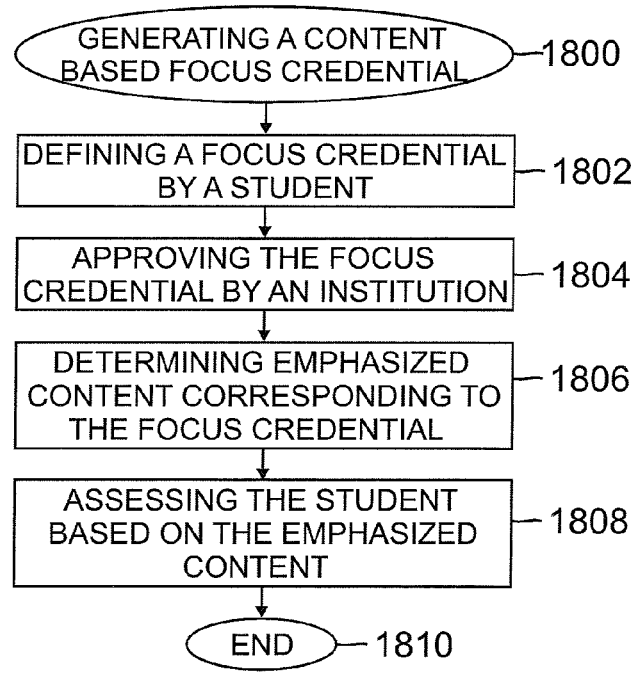
FIG. 18 is a flow chart illustrating generating a content based focus credential in accordance with one or more aspects of the present disclosure.

In accordance with one aspect of the present disclosure, a computer-implemented method for developing a content-based focus credential for a student is provided in FIG. 18. The processes can begin at block 1800. At block 1802, the processes can include defining a focus credential by a student. At block 1804, the processes can include approving the focus credential by an institution. At block 1806, the processes can include determining emphasized content corresponding to the focus credential. At block 1808, the processes can include assessing the student based on the emphasized content. The processes can end at block 1810.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for creating a focus credential, which is different from an academic degree credential for a degree as a whole assembled exclusively from entire courses applicable to the academic degree credential for the degree as a whole, and different from an academic field of study credential assembled exclusively from entire courses applicable to a field of study named in the academic field of study credential, where the academic degree credential for the degree as a whole and the academic field of study credential utilize exclusively entire courses, and the focus credential is different from a competency unit degree and field of study credential, where the competency unit degree and field of study credential utilize standard institutional assessments as a replacement for entire courses to determine knowledge and capabilities for earning academic credentials, the method for creating the focus credential comprising:

at least one processor programmed to perform:

storing a focus credential structure to include focus credential required activities, the focus credential required activities being a student focus content-generating activity consisting of individualized focus content produced by a student that is applicable to a personal focus of the student from courses enrolled in by the student but excluding utilization of entire courses and standard institutional assessments as a replacement for the entire courses, the personal focus of the student being a distinct field of study from the student's primary field of study which an institution does not provide through the academic field of study credential, and the focus credential being differently described, structured, and assembled than the academic degree credential for the degree as a whole and than the academic field of study credential and excluding utilization of the entire courses and the standard institutional assessments as a replacement for the entire courses;

associating an instance of the focus credential structure with the student;

calculating the student's progress toward completing the focus credential required activities needed to earn the focus credential, based only on the individualized focus content produced by the student applicable to the focus credential and excluding utilization of the entire courses and the standard institutional assessments as the replacement for the entire courses, and based on the individualized focus content produced by the student from courses in the student's primary field of study and from other fields of study outside the student's primary field of study including general education and other courses and from the standard institutional assessments as the replacement for the entire courses not applicable to the academic field of study credential that satisfies at least some of the focus credential required activities, and based on a distinct grade assessed for the individualized focus content produced by the student and excluding utilization of a grade for the entire course and a grade for the standard institutional assessments as the replacement for the entire courses and excluding course content grades for assessed course activities, the course content grades for assessed course activities being the grades for assessed course activities in which the student in the entire course participates regardless of whether the student has the personal focus, and based on an academic credit value of the individualized focus content produced by the student and excluding utilization of the academic credit value of the entire course and of the standard institutional assessments as the replacement for the entire courses, as stored in at least one database;

awarding the focus credential to the student, where the focus credential is an institutionally certified additional degree credential beyond the student's primary field of study and other institutional degree credentials determined by the entire courses and the standard institutional assessments as the replacement for the entire courses, when the focus credential required activities have been satisfied according to institutional requirements to earn the focus credential;

storing the institutional requirements to earn the focus credential including a minimum number of academic credits required to earn the focus credential, a cumulative average grade earned by the student across all the student focus content-generating activity as calculated by the institution, a minimum grade accepted by the institution for the student focus content-generating activity when required in order to apply the student focus content-generating activity to the focus credential, and the academic credit value which the institution applies to the student focus content-generating activity;

storing institutional assessment rules for assessing the focus credential, the institutional assessment rules including a definition of the applicability toward the focus credential of the individualized focus content produced by the student excluding utilization of the entire courses and of the standard institutional assessments as the replacement for the entire courses, and utilization of a distinct grade for the individualized focus content produced by the student that is different from the course content grades and a grade for the entire course and also different from a grade for the standard institutional assessments as the replacement for the entire courses, in determining whether the institutional requirements to earn the focus credential have been met;

storing institutional rules for determining a subject and a name of the focus credential, the institutional rules including the subject and the name that have been approved by the institution and institutional rules for adding additional subjects and names, and the name of the focus credential being earned by the student after the name of the focus credential has been determined;

storing an instance of the focus credential structure associated with the student for which the student is completing the focus credential required activities;

storing a record of the individualized focus content produced by the student from courses in the student's primary field of study and from other fields of study outside the student's primary field of study and from the standard institutional assessments as the replacement for the entire courses not applicable to the academic field of study credential that satisfies at least some of the focus credential required activities, the record being different from the grade for the entire course and the course content grades for the assessed course activities and also different from the grade for the standard institutional assessments as the replacement for the entire courses;

storing a record of a number of units of the academic credit value that are applied toward the focus credential for the student focus content-generating activity including one or more institutional rules for calculating the academic credit value, with the number of units of the academic credit value that are applied toward the focus credential from the student focus content-generating activity during the course and during the standard institutional assessments as the replacement for the entire courses being less than an academic credit value for the entire course and for the standard institutional assessments as the replacement for the entire courses in which the individualized focus content is produced by the student, and with the number of units of the academic credit value for the individualized focus content produced by the student applicable to the focus credential varying substantially between entire courses of the same academic credit value depending on the academic credit value of the individualized focus content produced by the student during the course and between the standard institutional assessments as the replacement for the entire courses;

storing institutional identifiers of the courses from which the student focus content-generating activity originates to allow identification of the course from which the student focus content-generating activity originates, the institutional identifiers including titles and numbers; and storing records of student focus content-generating activity assessments, excluding the course content grades and the grade for the standard institutional assessments as the replacement for the entire courses and a grade for other institutional assessments applicable only to the academic field of study credential, as required by the institution for the student focus content-generating activity in each course and each standard institutional assessments as the replacement of the entire courses containing the individualized focus content produced by the student that the student applies to earning the focus credential.

2. The method of claim 1, further comprising defining the focus credential structure, wherein defining the focus credential structure comprises selecting the focus credentials based on at least one of search engine traffic and results, social media sites, job statistics including projections, competitive analysis of other institutional offerings, student input, alumni input, employer input, surveys, brainstorming, opinions of academic personnel and regulatory authorities, and market research.

3. The method of claim 1, wherein student generated content satisfying at least some of the focus credential required activities comprises evaluating the student based on at least one of courses, programs, capstone projects, independent studies, essays, presentations, synchronous/"live" and asynchronous/non-live discussions, class participation, course homework projects, interactions, portfolios, other course-related activity, and combinations thereof.

4. The method of claim 1, wherein student generated content in course activities satisfying at least some of the focus credential required activities comprises assessing the student generated content from at least one of instructor assessment, information and communication system assessment, specialized assessment, portfolio assessment, blended assessment and combinations thereof.

5. The method of claim 1, wherein the required activities comprises at least one of a number of essay pages and a number of discussion comments.

6. The method of claim 1, wherein the focus credential is related to a liberal arts degree.

7. The method of claim 1, further comprising defining the focus credential, wherein defining the focus credential comprises the student specifying the focus credential required activities and an institution approving the student specified required activities.

8. The method of claim 1, wherein the focus credential structure is a credential template specifying general focus credential requirements and associating an instance of the focus credential structure with a student including instantiating a specific instance of the template as a student specific focus credential data construct associated with the student.

9. The method of claim 8, comprising the institution allowing and the student providing a descriptive title for the student specific focus credential data construct wherein the descriptive title indicates the focus of the focus credential associated with the student.

10. The method of claim 8, wherein student generated content satisfying at least some of the focus credential required activities comprises evaluating the student generated content against a focus of the credential associated with the student and when the student generated content correlates with the focus of the credential, indicating that a required activity has been satisfied.

11. The method of claim 8, wherein the credential template specifies types of required activities, the quantities of content satisfying each required activity type and the quality of the content that is required for the content satisfying each required activity type.

12. The method of claim 1, wherein said associating an instance of the focus credential structure with the student occurs prior to generation of at least some of the student generated content.

13. The method of claim 1, wherein said associating an instance of the focus credential structure with the student occurs after generation of at least some of the student generated content.

14. The method of claim 1, wherein the course content grades for assessed course activities in which the student in the entire course participates regardless of whether the student has the personal focus are used in calculating the student's progress toward completing the focus credential required activities needed to earn the focus credential for less than 50% of focus content produced by the student.

15. The method of claim 1, wherein the academic credit value for the entire course in which the student in the entire course participates regardless of whether the student has the personal focus are used in calculating the student's progress toward completing the focus credential required activities needed to earn the focus credential for less than 50% of courses during which focus content is produced by the student, when more than 50% of the individualized content produced by the student during the entire course is applicable to the focus credential.

16. The method of claim 1, wherein the student or an administrator or an instructor or other personnel of the institution or a third-party service provider of the institution enters information on the focus content into a database.

17. The method of claim 1, wherein the student or an administrator or an instructor or other personnel of the institution or a third-party service provider of the institution calculates a distinct grade for the focus content or all or part of an academic credit value for the focus content.

18. The method of claim 1, wherein the focus credential is marketed to potential students using at least one of a search engine or Facebook or other social media or Internet advertising or email or other Internet marketing using words from a name of the focus credential.

19. The method of claim 1, wherein the focus credential is marketed to potential students using at least one of television or radio or newspaper or telephone or texting or other direct marketing or other non-Internet marketing means using words from a name of the focus credential.

20. The method of claim 1, wherein the stored record of the individualized focus content produced by the student is applied to earn the focus credential after the student has earned the academic degree credential for the degree as a whole and the academic field of study credential or the competency unit degree and field of study credential.

21. The method of claim 1, wherein the student first determines the focus credential structure and a focus credential name without utilization of the focus credential structure and the focus credential name previously determined by the institution, and then the institution approves a student-determined focus credential structure and a student-determined focus credential name.

22. The method of claim 1, wherein a credit awarded by the institution for content generated by the student to satisfy the focus credential requirements is based primarily on portions of a plurality of courses rather than whole courses.

23. The method of claim 22, wherein a significant portion of the credit awarded by the institution for content generated by the student to satisfy the focus credential requirements is from portions of a plurality of courses from non-major courses not directly related to the focus subject area.

24. A method for creating a focus credential, which is different from an academic degree credential for a degree as a whole assembled exclusively from entire courses applicable to the academic degree credential for the degree as a whole, and different from an academic field of study credential assembled exclusively from entire courses applicable to a field of study named in the academic field of study credential, where the academic degree credential for the degree as a whole and the academic field of study credential utilize exclusively entire courses, and the focus credential is different from a competency unit degree and field of study credential, where the competency unit degree and field of study credential utilize standard institutional assessments as a replacement for entire courses to determine knowledge and capabilities for earning academic credentials, the method for creating the focus credential comprising:

at least one processor programmed to perform:

storing a focus credential structure including focus credential required activities, the focus credential required activities being a student focus content-generating activity consisting of individualized focus content produced by a student that is applicable to a personal focus of the student from courses enrolled in by the student but excluding utilization of entire courses and the standard institutional assessments as a replacement for entire courses, the personal focus of the student being a distinct field of study from the student's primary field of study which an institution does not provide through the academic field of study credential, and the focus credential being differently described, structured, and assembled than the academic degree credential for the degree as a whole and than the academic field of study credential and excluding utilization of the entire courses and the standard institutional assessments as a replacement for the entire courses;

associating an instance of the focus credential structure with the student;

calculating the student's progress toward completing the focus credential required activities needed to earn the focus credential, based only on the individualized focus content produced by the student applicable to the focus credential and excluding utilization of the entire courses and the standard institutional assessments as the replacement for entire courses, and based on an academic credit value of the individualized focus content produced by the student and excluding utilization of the academic credit value of the entire course and the standard institutional assessments as the replacement for the entire courses, as stored in at least one database;

awarding the focus credential to the student, where the focus credential is an institutionally certified additional degree credential beyond the student's primary field of study and other institutional degree credentials determined by the entire courses and the standard institutional assessments as the replacement for entire courses, when the focus credential required activities have been satisfied according to institutional requirements to earn the focus credential;

storing the institutional requirements to earn the focus credential including a minimum number of academic credits required to earn the focus credential, and the academic credit value which the institution applies to the student focus content-generating activity;

storing institutional assessment rules for assessing the focus credential, the institutional assessment rules including a definition of the applicability toward the focus credential of the individualized focus content produced by the student excluding utilization of the entire courses and of the standard institutional assessments as the replacement for the entire courses, in determining whether the institutional requirements to earn the focus credential have been met;

storing an instance of the focus credential structure associated with the student for which the student is completing the focus credential required activities;

storing a record of the individualized focus content produced by the student from courses in the student's primary field of study and from other fields of study outside the student's primary field of study and from the standard institutional assessments as the replacement for the entire courses not applicable to the academic field of study credential that satisfies at least some of the focus credential required activities;

storing a record of a number of units of the academic credit value that are applied toward the focus credential for the student focus content-generating activity including one or more institutional rules for calculating the academic credit value, with the number of units of the academic credit value that are applied toward the focus credential from the student focus content-generating activity during the course and during the standard institutional assessments as the replacement for the entire courses being less than an academic credit value for the entire course and for the standard institutional assessments as the replacement for the entire courses in which the individualized focus content is produced by the student, and with the number of units of the academic credit value for the individualized focus content produced by the student applicable to the focus credential varying substantially between entire courses of the same academic credit value depending on the academic credit value of the individualized focus content produced by the student during the course and between the standard institutional assessments as the replacement for the entire courses; and storing records of student focus content-generating activity assessments as required by the institution for the student focus content-generating activity in each course and each standard assessments as the replacement for the entire courses containing the individualized focus content produced by the student that the student applies to earning the focus credential.

25. The method of claim 24, further comprising defining the focus credential structure, wherein defining the focus credential structure comprises specifying different types of required activities along with quantity and quality of each of the types of required activities.

26. The method of claim 25, wherein the types of required activities comprise at least one of essays, discussion comments and presentation metrics.

27. The method of claim 26, wherein one type of presentation metric comprises presentation slides.

28. The method of claim 24, wherein said associating an instance of the focus credential structure comprises the institution allowing and the student selecting one of the focus credential structures to instantiate a student specific instance of a credential data construct for subsequent use in tracking the student's progress toward obtaining the focus credential.

29. The method of claim 24, further comprising identifying sub-portions of student generated content, wherein said identifying sub-portions of student generated content comprises, for a first course, identifying less than all of the student generated content to be applied to a first of the required activities and identifying less than all of the student generated content to be applied to a second of the required activities.

30. The method of claim 24, further comprising identifying sub-portions of student generated content to be applied wherein at least a first focus credential required activity is defined at least in part as a quantity of content and wherein said identifying sub-portions of student generated content to be applied includes identifying a sub-portion of a first activity performed in a first course to satisfy a first portion of the first focus credential required activity and identifying a sub-portion of a second activity performed in a second course to satisfy a second portion of the first focus credential required activity.

31. The method of claim 24, wherein the entire courses and at least one competency unit are used as the student focus content in calculating the student's progress toward completing the focus credential required activities needed to earn the focus credential and to compile and consolidate focus content, when more than 50% of the individualized content produced by the student during the entire course is applicable to the focus credential, with the total of the academic credit value from the entire course and the at least one competency unit not to exceed 50% of the academic credit value required to earn the focus credential, the other at least 50% of the academic credit value required to earn the focus credential being from the focus content excluding utilization of the entire courses and the standard institutional assessments as the replacement for the entire courses.

32. The method of claim 24, wherein the course content grades for assessed course activities in which the student in the entire course participates regardless of whether the student has the personal focus are used in calculating the student's progress toward completing the focus credential required activities needed to earn the focus credential for less than 50% of focus content produced by the student.

33. The method of claim 24, wherein the academic credit value for the entire course in which the student in the entire course participates regardless of whether the student has the personal focus are used in calculating the student's progress toward completing the focus credential required activities needed to earn the focus credential for less than 50% of courses during which focus content is produced by the student, when more than 50% of the individualized content produced by the student during the entire course is applicable to the focus credential.

34. The method of claim 24, wherein the student or an administrator or an instructor or other personnel of the institution or a third-party service provider of the institution enters information on the focus content into a database.

35. The method of claim 24, wherein the student or an administrator or an instructor or other personnel of the institution or a third-party service provider of the institution calculates a distinct grade for the focus content or all or part of an academic credit value for the focus content.

36. The method of claim 24, wherein the focus credential is marketed to potential students using at least one of a search engine or Facebook or other social media or Internet advertising or email or other Internet marketing using words from a name of the focus credential.

37. The method of claim 24, wherein the focus credential is marketed to potential students using at least one of television or radio or newspaper or telephone or texting or other direct marketing or other non-Internet marketing means using words from a name of the focus credential.

38. The method of claim 24, wherein the stored record of the individualized focus content produced by the student is applied to earn the focus credential after the student has earned the academic degree credential for the degree as a whole and the academic field of study credential or the competency unit degree and field of study credential.

39. The method of claim 24, wherein the student first determines the focus credential structure and a focus credential name without utilization of the focus credential structure and the focus credential name previously determined by the institution, and then the institution approves a student-determined focus credential structure and a student-determined focus credential name.

40. The method of claim 24, wherein a credit awarded by the institution for content generated by the student to satisfy the focus credential requirements is based primarily on portions of a plurality of courses rather than whole courses.

41. The method of claim 40, wherein a significant portion of the credit awarded by the institution for content generated by the student to satisfy the focus credential requirements is from portions of a plurality of courses from non-major courses not directly related to the focus subject area.

42. A system for creating a focus credential, which is different from an academic degree credential for a degree as a whole assembled exclusively from entire courses applicable to the academic degree credential for the degree as a whole, and different from an academic field of study credential assembled exclusively from entire courses applicable to a field of study named in the academic field of study credential, where the academic degree credential for the degree as a whole and the academic field of study credential utilize exclusively entire courses, and the focus credential is different from a competency unit degree and field of study credential, where the competency unit degree and field of study credential utilize standard institutional assessments as a replacement for entire courses to determine knowledge and capabilities for earning academic credentials, the system for creating the focus credential comprising:

at least one processor programmed to perform:
storing a focus credential structure that includes focus credential required activities, the focus credential required activities being a student focus content-generating activity consisting of individualized focus content produced by a student that is applicable to a personal focus of the student from courses enrolled in by the student but excluding utilization of entire courses and standard institutional assessments as a replacement for the entire courses, the personal focus of the student being a distinct field of study from the student's primary field of study which an institution does not provide through the academic field of study credential, and the focus credential being differently described, structured, and assembled than the academic degree credential for the degree as a whole and than the academic field of study credential and excluding utilization of the entire courses and the standard institutional assessments as a replacement for the entire courses;

associating an instance of the focus credential structure with the student;

calculating the student's progress toward completing the focus credential required activities needed to earn the focus credential, based only on the individualized focus content produced by the student applicable to the focus credential and excluding utilization of the entire courses and the standard institutional assessments as the replacement for the entire courses, and based on the individualized focus content produced by the student from courses in the student's primary field of study and from other fields of study outside the student's primary field of study including general education and other courses and from the standard institutional assessment as the replacement for the entire courses not applicable to the academic field of study credential that satisfies at least some of the focus credential required activities, and based on a distinct grade assessed for the individualized focus content produced by the student and excluding utilization of a grade for the entire course and a grade for the standard institutional assessments as the replacement for the entire courses and excluding course content grades for assessed course activities, the course content grades for assessed course activities being the grades for assessed course activities in which the student in the entire course participates regardless of whether the student has the personal focus, and based on an academic credit value of the individualized focus content produced by the student and excluding utilization of the academic credit value of the entire course and of the standard institutional assessments as the replacement for the entire courses, as stored in at least one database;

awarding the focus credential to the student, where the focus credential is an institutionally certified additional degree credential beyond the student's primary field of study and other institutional degree credentials determined by the entire courses and the standard institutional assessments as the replacement for the entire courses, when the focus credential required activities have been satisfied according to institutional requirements to earn the focus credential;

the at least one database to store:
the institutional requirements to earn the focus credential including a minimum number of academic credits required to earn the focus credential, a cumulative average grade earned by the student across all the student focus content-generating activity as calculated by the institution, a minimum grade accepted by the institution for the student focus content-generating activity when required in order to apply the student focus content-generating activity to the focus credential, and the academic credit value which the institution applies to the student focus content-generating activity;

institutional assessment rules for assessing the focus credential, the institutional assessment rules including a definition of the applicability toward the focus credential of the individualized focus content produced by the student excluding utilization of the entire courses and of the standard institutional assessments as the replacement for the entire courses, and utilization of a distinct grade for the individualized focus content produced by the student that is different from the course content grades and a grade for the entire course and also different from the grade for the standard institutional assessments as the replacement for the entire courses, in determining whether the institutional requirements to earn the focus credential have been met;

institutional rules for determining a subject and a name of the focus credential, the institutional rules including the subject and the name that have been approved by the institution and institutional rules for adding additional subjects and names, and the name of the focus credential being earned by the student after the name of the focus credential has been determined;

an instance of the focus credential structure associated with the student for which the student is completing the focus credential required activities;

a record of the individualized focus content produced by the student from courses in the student's primary field of study and from other fields of study outside the student's primary field of study and from the standard institutional assessments as the replacement for the entire courses not applicable to the academic field of study credential that satisfies at least some of the focus credential required activities, the record being different from the grade for the entire course and the course content grades for the assessed course activities and also different from the grade for the standard institutional assessments as the replacement for the entire courses;

a record of a number of units of the academic credit value that are applied toward the focus credential for the student focus content-generating activity including one or more institutional rules for calculating the academic credit value, with the number of units of the academic credit value that are applied toward the focus credential from the student focus content-generating activity during the course and during the standard institutional assessments as the replacement for the entire courses being less than an academic credit value for the entire course and for the standard institutional assessments as the replacement for the entire courses in which the individualized focus content is produced by the student, and with the number of units of the academic credit value for the individualized focus content produced by the student applicable to the focus credential varying substantially between entire courses of the same academic credit value depending on the academic credit value of the individualized focus content produced by the student during the course and between the standard institutional assessments as the replacement for the entire courses;

institutional identifiers of the courses from which the student focus content-generating activity originates to allow identification of the course from which the student focus content-generating activity originates, the institutional identifiers including titles and numbers; and records of student focus content-generating activity assessments, excluding the course content grades and the grade for the standard institutional assessments as the replacement for the entire courses and a grade for other institutional assessments applicable only to the academic field of study credential, as required by the institution for the student focus content-generating activity in each course and each standard institutional assessments as the replacement for the entire courses containing the individualized focus content produced by the student that the student applies to earning the focus credential.

43. The system of claim 42, wherein student generated content satisfying at least some of the focus credential required activities includes evaluating the student based on at least one of courses, programs, capstone projects, independent studies, essays, presentations, synchronous/"live" and asynchronous/non-live discussions, class participation, course homework projects, interactions, portfolios, other course-related activity, and combinations thereof.

44. The system of claim 42, wherein student generated content in course activities satisfying at least some of the focus credential required activities includes assessing the student generated content using at least one of instructor assessment, information and communication system assessment, specialized assessment, portfolio assessment, blended assessment or combinations thereof.

45. The system of claim 42, wherein said associating an instance of the focus credential structure with the student occurs prior to generation of at least some of the student generated content.

46. The system of claim 42, wherein said associating an instance of the focus credential structure with the student occurs after generation of at least some of the student generated content.

47. The system of claim 42, wherein the course content grades for assessed course activities in which the student in the entire course participates regardless of whether the student has the personal focus are used in calculating the student's progress toward completing the focus credential required activities needed to earn the focus credential for less than 50% of focus content produced by the student.

48. The system of claim 42, wherein the academic credit value for the entire course in which the student in the entire course participates regardless of whether the student has the personal focus are used in calculating the student's progress toward completing the focus credential required activities needed to earn the focus credential for less than 50% of courses during which focus content is produced by the student, when more than 50% of the individualized content produced by the student during the entire course is applicable to the focus credential.

49. The system of claim 42, wherein the student or an administrator or an instructor or other personnel of the institution or a third-party service provider of the institution enters information on the focus content into the database.

50. The system of claim 42, wherein the student or an administrator or an instructor or other personnel of the institution or a third-party service provider of the institution calculates a distinct grade for the focus content or all or part of an academic credit value for the focus content.

51. The system of claim 42, wherein the focus credential is marketed to potential students using at least one of a search engine or Facebook or other social media or Internet advertising or email or other Internet marketing using words from a name of the focus credential.

52. The system of claim 42, wherein the focus credential is marketed to potential students using at least one of television or radio or newspaper or telephone or texting or other direct marketing or other non-Internet marketing means using words from a name of the focus credential.

53. The system of claim 42, wherein the stored record of the individualized focus content produced by the student is applied to earn the focus credential after the student has earned the academic degree credential for the degree as a whole and the academic field of study credential or the competency unit degree and field of study credential.

54. The system of claim 42, wherein the student first determines the focus credential structure and a focus credential name without utilization of the focus credential structure and the focus credential name previously determined by the institution, and then the institution approves a student-determined focus credential structure and a student-determined focus credential name.

55. The system of claim 42, wherein a credit awarded by the institution for content generated by the student to satisfy the focus credential requirements is based primarily on portions of a plurality of courses rather than whole courses.

56. The system of claim 55, wherein a significant portion of the credit awarded by the institution for content generated by the student to satisfy the focus credential requirements is from portions of a plurality of courses from non-major courses not directly related to the focus subject area.

57. A system for creating a focus credential, which is different from an academic degree credential for a degree as a whole assembled exclusively from entire courses applicable to the academic degree credential for the degree as a whole, and different from an academic field of study credential assembled exclusively from entire courses applicable to a field of study named in the academic field of study credential, where the academic degree credential for the degree as a whole and the academic field of study credential utilize exclusively entire courses, and the focus credential is different from a competency unit degree and field of study credential, where the competency unit degree and field of study credential utilize standard institutional assessments as a replacement for entire courses to determine knowledge and capabilities for earning academic credentials, the system for creating the focus credential comprising:

at least one processor programmed to perform:
  storing a focus credential structure that includes focus credential required activities, the focus credential required activities being a student focus content-generating activity consisting of individualized focus content produced by a student that is applicable to a personal focus of the student from courses enrolled in by the student but excluding utilization of entire courses and standard institutional assessments as a replacement for the entire courses, the personal focus of the student being a distinct field of study from the student's primary field of study which an institution does not provide through the academic field of study credential, and the focus credential being differently described, structured, and assembled than the academic degree credential for the degree as a whole and than the academic field of study credential and excluding utilization of the entire courses and the standard institutional assessments as a replacement for the entire courses;
  associating an instance of the focus credential structure with the student;
  calculating the student's progress toward completing the focus credential required activities needed to earn the focus credential, based only on the individualized focus content produced by the student applicable to the focus credential and excluding utilization of the entire courses and the standard institutional assessments as the replacement for the entire courses, and based on an academic credit value of the individualized focus content produced by the student and excluding utilization of the academic credit value of the entire course and of the standard institutional assessments as the replacement for the entire courses, as stored in at least one database;

awarding the focus credential to the student, where the focus credential is an institutionally certified additional degree credential beyond the student's primary field of study and other institutional degree credentials determined by the entire courses and the standard institutional assessments as the replacement for the entire courses, when the focus credential required activities have been satisfied according to institutional requirements to earn the focus credential;

the at least one database to store:

the institutional requirements to earn the focus credential including a minimum number of academic credits required to earn the focus credential, and the academic credit value which the institution applies to the student focus content-generating activity;

institutional assessment rules for assessing the focus credential, the institutional assessment rules including a definition of the applicability toward the focus credential of the individualized focus content produced by the student excluding utilization of the entire courses and of the standard institutional assessments as the replacement for the entire courses, in determining whether the institutional requirements to earn the focus credential have been met;

an instance of the focus credential structure associated with the student for which the student is completing the focus credential required activities;

a record of the individualized focus content produced by the student from courses in the student's primary field of study and from other fields of study outside the student's primary field of study and from the standard institutional assessments as the replacement for the entire courses not applicable to the academic field of study credential that satisfies at least some of the focus credential required activities;

a record of a number of units of the academic credit value that are applied toward the focus credential for the student focus content-generating activity including one or more institutional rules for calculating the academic credit value, with the number of units of the academic credit value that are applied toward the focus credential from the student focus content-generating activity during the course and during the standard institutional assessments as the replacement for the entire courses being less than an academic credit value for the entire course and for the standard institutional assessments as the replacement for the entire courses in which the individualized focus content is produced by the student, and with the number of units of the academic credit value for the individualized focus content produced by the student applicable to the focus credential varying substantially between entire courses of the same academic credit value depending on the academic credit value of the individualized focus content produced by the student during the course and between the standard institutional assessments as the replacement for the entire courses; and records of student focus content-generating activity assessments as required by the institution for the student focus content-generating activity in each course and each standard institutional assessments as the replacement for the entire courses containing the individualized focus content produced by the student that the student applies to earning the focus credential.

58. The system of claim 57, wherein a credit awarded by the institution for content generated by the student to satisfy the focus credential requirements is based primarily on portions of a plurality of courses rather than whole courses.

59. The system of claim 58, wherein a significant portion of the credit awarded by the institution for content generated by the student to satisfy the focus credential requirements is from portions of a plurality of courses from non-major courses not directly related to the focus subject area.

60. The system of claim 57, wherein the entire courses and at least one competency unit are used as the student focus content in calculating the student's progress toward completing the focus credential required activities needed to earn the focus credential and to compile and consolidate focus content, when more than 50% of the individualized content produced by the student during the entire course is applicable to the focus credential, with the total of the academic credit value from the entire course and the at least one competency unit not to exceed 50% of the academic credit value required to earn the focus credential, the other at least 50% of the academic credit value required to earn the focus credential being from the focus content excluding utilization of the entire courses and the standard institutional assessments as the replacement for the entire courses.

61. The system of claim 57, wherein the course content grades for assessed course activities in which the student in the entire course participates regardless of whether the student has the personal focus are used in calculating the student's progress toward completing the focus credential required activities needed to earn the focus credential for less than 50% of focus content produced by the student.

62. The system of claim 57, wherein the academic credit value for the entire course in which the student in the entire course participates regardless of whether the student has the personal focus are used in calculating the student's progress toward completing the focus credential required activities needed to earn the focus credential for less than 50% of courses during which focus content is produced by the student, when more than 50% of the individualized content produced by the student during the entire course is applicable to the focus credential.

63. The system of claim 57, wherein the student or an administrator or an instructor or other personnel of the institution or a third-party service provider of the institution enters information on the focus content into the database.

64. The system of claim 57, wherein the student or an administrator or an instructor or other personnel of the institution or a third-party service provider of the institution calculates a distinct grade for the focus content or all or part of an academic credit value for the focus content.

65. The system of claim 57, wherein the focus credential is marketed to potential students using at least one of a search engine or Facebook or other social media or Internet advertising or email or other Internet marketing using words from a name of the focus credential.

66. The system of claim 57, wherein the focus credential is marketed to potential students using at least one of television or radio or newspaper or telephone or texting or other direct marketing or other non-Internet marketing means using words from a name of the focus credential.

67. The system of claim 57, wherein the stored record of the individualized focus content produced by the student is applied to earn the focus credential after the student has earned the academic degree credential for the degree as a whole and the academic field of study credential or the competency unit degree and field of study credential.

68. The system of claim 57, wherein the student first determines the focus credential structure and a focus credential name without utilization of the focus credential structure and the focus credential name previously determined by the institution, and then the institution approves a student-determined focus credential structure and a student-determined focus credential name.

\* \* \* \* \*